United States Patent
Kanetaka et al.

(10) Patent No.: US 8,693,107 B2
(45) Date of Patent: Apr. 8, 2014

(54) ZOOM LENS AND IMAGING APPARATUS

(75) Inventors: Fumikazu Kanetaka, Chiba (JP); Atsuo Kikuchi, Kanagawa (JP)

(73) Assignee: Sony Corporation, Tokyo (JP)

(*) Notice: Subject to any disclaimer, the term of this patent is extended or adjusted under 35 U.S.C. 154(b) by 68 days.

(21) Appl. No.: 13/371,494

(22) Filed: Feb. 13, 2012

(65) Prior Publication Data

US 2012/0206819 A1  Aug. 16, 2012

(30) Foreign Application Priority Data

Feb. 15, 2011 (JP) ................................. 2011-029882

(51) Int. Cl.
*G02B 15/14* (2006.01)
*G02B 15/173* (2006.01)

(52) U.S. Cl.
CPC ................................... *G02B 15/173* (2013.01)
USPC .......................................... 359/687; 359/686

(58) Field of Classification Search
USPC .......................................... 359/686, 687, 747
See application file for complete search history.

(56) References Cited

U.S. PATENT DOCUMENTS

| 7,253,965 B2 * | 8/2007 | Shibayama et al. | 359/687 |
| 2011/0058261 A1 * | 3/2011 | Kakimoto | 359/687 |

FOREIGN PATENT DOCUMENTS

| JP | 2007-122019 | 5/2007 |
| JP | 2009-075581 | 4/2009 |

* cited by examiner

*Primary Examiner* — William Choi
(74) *Attorney, Agent, or Firm* — Rader, Fishman & Grauer PLLC

(57) ABSTRACT

A zoom lens includes a first lens group having a positive refracting power, a second lens group having a negative refracting power, a third lens group having a positive refracting power, and a fourth lens group having a positive refracting power. When the zoom lens is zoomed from a wide-angle end state to a telephoto end state, the first lens group is moved toward the object side so that a distance between the first and second lens groups increases and the third lens group is moved toward the object side so that a distance between the second and third lens groups decreases. The second lens group includes three lenses: negative, positive, and negative lenses in order from the object side to the image side. The third lens group includes three lenses: positive, negative, and positive lenses in order from the object side to the image side.

12 Claims, 17 Drawing Sheets

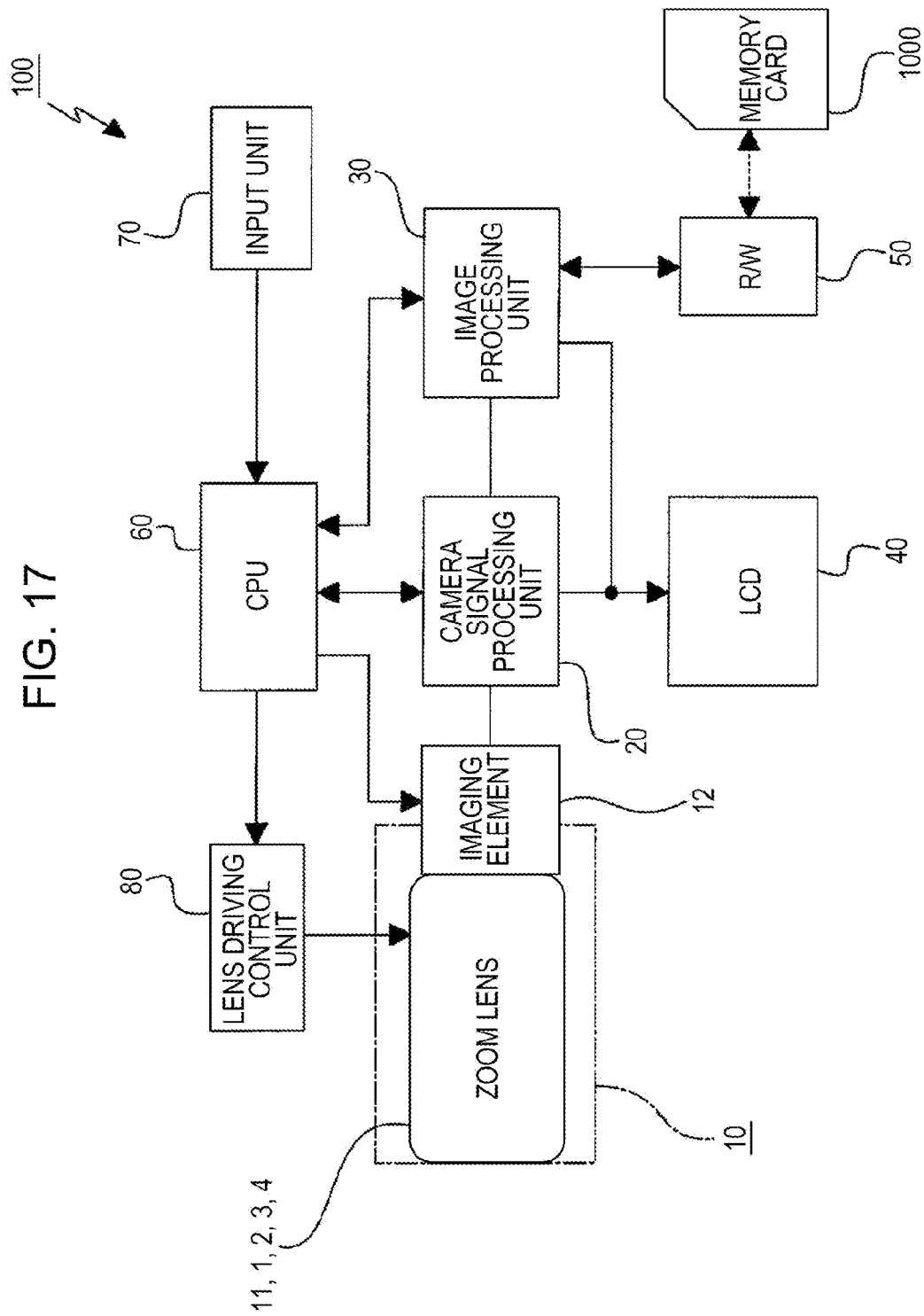

ZOOM LENS AND IMAGING APPARATUS

BACKGROUND

The present technology relates to a zoom lens and an imaging apparatus, and more particularly, to a zoom lens, which has a small size and a highly variable magnifying power and is suitable for an electronic camera such as a digital video camera or a digital still camera, and an imaging apparatus.

In recent years, digital video cameras or digital still cameras using solid-state imaging devices such as CCD (Charge Coupled Device) or CMOS (Complementary Metal Oxide Semiconductor) have been rapidly spread. As these digital cameras or the like have been spread, there is a high demand for zoom lenses which have a wide angle and a highly variable magnifying power and which can be easily carried and have a large number of pixels.

Due to the demand, in particular, imaging apparatuses including a zoom lens that has a small size and a highly variable magnifying power have been widely used.

According to the related art, there are known zoom lenses that have a positive, negative, positive, and positive four-group configuration, and some zoom lens have the zoom magnifying power of about 10-fold (see Japanese Unexamined Patent Application Publication No. 2007-122019 and Japanese Unexamined Patent Application Publication No. 2009-75581).

The zoom lens disclosed in Japanese Unexamined Patent Application Publication No. 2007-122019 has a positive, negative, positive, and positive four-group configuration such that a variable magnifying power of up to about 11-fold is realized.

The zoom lens disclosed in Japanese Unexamined Patent Application Publication No. 2009-75581 has a positive, negative, positive, and positive four-group configuration. The variable magnifying power of the zoom lens is about 10-fold and the miniaturization of the zoom lens is realized.

SUMMARY

In the zoom lenses disclosed in Japanese Unexamined Patent Application Publication No. 2007-122019 and Japanese Unexamined Patent Application Publication No. 2009-75581, however, a highly variable magnifying power and a wide angle have not sufficiently be realized. In order to realize a highly variable magnifying power, in general, the number of lenses has to be increased or the entire length of an optical system has to be increased. Moreover, in order to realize the wide angle, various off-axis aberrations at a wide-angle end have to be satisfactorily corrected. However, the number of lenses or the diameter of the lens may be increased.

It is desirable to provide a zoom lens and an imaging apparatus capable of resolving the above-mentioned problems and realizing a wide angle and a highly variable magnifying power while having a small size and an excellent optical performance in the entire zoom region.

According to an embodiments of the present technology, there is provided a zoom lens including a first lens group having a positive refracting power, a second lens group having a negative refracting power, a third lens group having a positive refracting power, and a fourth lens group having a positive refracting power arranged in order from an object side to an image side. When the zoom lens is zoomed from a wide-angle end state to a telephoto end state, the first lens group is moved toward the object side so that a distance between the first and second lens groups increases and the third lens group is moved toward the object side so that a distance between the second and third lens groups decreases.

The second lens group includes three lenses, that is, a negative lens, a positive lens, and a negative lens in order from the object side to the image side. The third lens group includes three lenses, that is, a positive lens, a negative lens, and a positive lens in order from the object side to the image side.

In the zoom lens with such a configuration, the aberration generated in each of the second and third lens groups is satisfactorily corrected and a variable magnifying power effect of the second and third lens groups is improved.

In the zoom lens according to the embodiment of the present technology, Condition Equation (1) below may be satisfied:

$$0.06 < |f2/ft| < 0.12, \tag{1}$$

where f2 is a focal distance of the second lens group and ft is a focal distance of the entire lens system at the telephoto end.

When the zoom lens satisfies Condition Equation (1), the refracting power of the second lens group can be made to be proper and the variation in the astigmatism is suppressed in zooming.

In the zoom lens according to the embodiment of the present technology, Condition Equation (2) below may be satisfied:

$$0.10 < f3/ft < 0.25, \tag{2}$$

where f3 is a focal distance of the third lens group and ft is a focal distance of the entire lens system at the telephoto end.

When the zoom lens satisfies Condition Equation (2), the refracting power of the third lens group and the movement amount can be made to be proper.

In the zoom lens according to the embodiment of the present technology, Condition Equation (3) below may be satisfied:

$$0.9 < f21/f2 < 1.4, \tag{3}$$

where f21 is a focal distance of a negative lens disposed closest to the object side in the second lens group and f2 is a focal distance of the second lens group.

When the zoom lens satisfies Condition Equation (3), the refracting power of the negative lens on the object side in the second lens group can be made to be proper.

In the zoom lens according to the embodiment of the present technology, Condition Equation (4) below may be satisfied:

$$0.50 < f1/ft < 0.65, \tag{4}$$

where f1 is a focal distance of the first lens group and ft is a focal distance of the entire lens system at the telephoto end.

When the zoom lens satisfies Condition Equation (4), the refracting power of the first lens group can be made to be proper and the generation of coma aberration or astigmatism at the telephoto end is suppressed.

In the zoom lens according to the embodiment of the present technology, Condition Equation (5) below may be satisfied:

$$0.4 < d31/D3 < 0.8, \tag{5}$$

where d31 is a thickness of the positive lens disposed closest to the object side in the third lens group and D3 is a thickness of the entire third lens group along an optical axis.

When the zoom lens satisfies Condition Equation (5), the refracting power of the positive lens disposed closest to the object side in the third lens group can be made to be proper and the spherical aberration is satisfactorily corrected.

In the zoom lens according to the embodiment of the present technology, Condition Equation (6) below may be satisfied:

$$0.9 < Lt/ft < 1.3, \quad (6)$$

where Lt is an entire length of the lens system in a telephoto end and ft is a focal distance of the entire lens system at the telephoto end.

When the zoom lens satisfies Condition Equation (6), the zoom lens is miniaturized.

In the zoom lens according to the embodiment of the present technology, the first lens group may include three lenses, that is, a negative lens, a positive lens, and a positive lens arranged in order from the object side to the image side.

When the first lens group includes three lenses, that is, the negative lens, the positive lens, and the positive lens arranged in order from the object side to the image side, the positive refracting power of the first lens group is distributed to the two positive lenses.

In the zoom lens according to the embodiment of the present technology, Condition Equation (7) below may be satisfied:

$$8 < ft/fw < 20, \quad (7)$$

where ft is a focal distance of the entire lens system at a telephoto end and fw is a focal distance of the entire lens system at a wide-angle end.

When the zoom lens satisfies Condition Equation (7), a highly variable magnifying power is realized.

According to another embodiment of the present technology, there is provided an imaging apparatus including: a zoom lens; and an imaging element that converts an optical image formed by the zoom lens into an electric signal. The zoom lens includes a first lens group having a positive refracting power, a second lens group having a negative refracting power, a third lens group having a positive refracting power, and a fourth lens group having a positive refracting power arranged in order from an object side to an image side. When the zoom lens is zoomed from a wide-angle end state to a telephoto end state, the first lens group is moved toward the object side so that a distance between the first and second lens groups increases and the third lens group is moved toward the object side so that a distance between the second and third lens groups decreases. The second lens group includes three lenses, that is, a negative lens, a positive lens, and a negative lens in order from the object side to the image side. The third lens group includes three lenses, that is, a positive lens, a negative lens, and a positive lens in order from the object side to the image side.

In the imaging apparatus with such a configuration, the aberration generated in each of the second and third lens groups of the zoom lens is satisfactorily corrected and the variable magnifying power effect of the second and third lens groups is improved.

The zoom lens and the imaging apparatus according to the embodiments of the present technology are capable of realizing a wide angle and a highly variable magnifying power while having a small size and an excellent optical performance in the entire zoom region.

BRIEF DESCRIPTION OF THE DRAWINGS

FIG. 17 is a block diagram illustrating an example of an imaging apparatus.

DETAILED DESCRIPTION OF EMBODIMENTS

Figure 1:
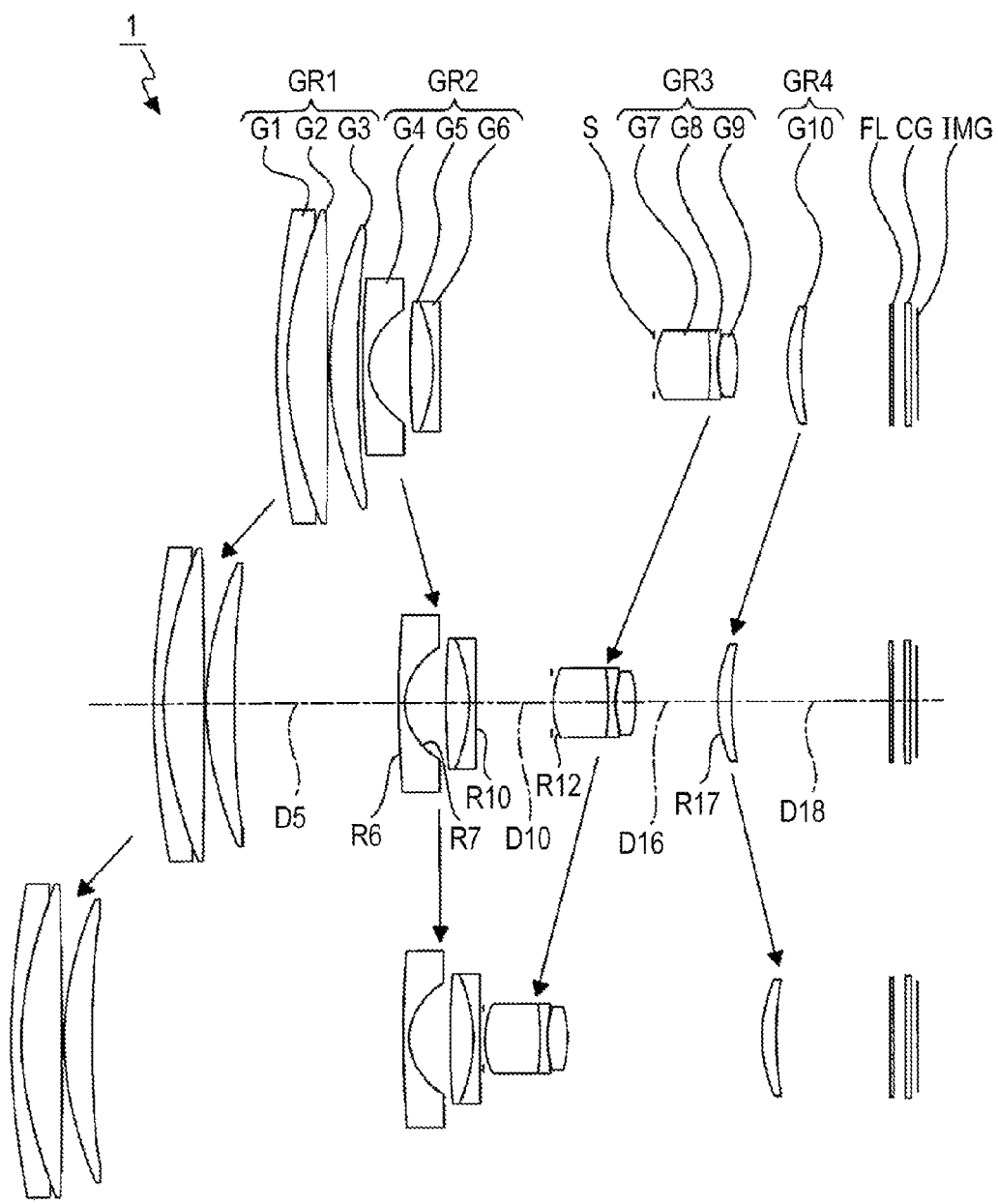
FIG. 1 is a diagram illustrating the configuration of a zoom lens according to a first embodiment.

Hereinafter, a zoom lens and an imaging apparatus according to preferred embodiments will be described.

Configuration of Zoom Lens

In the zoom lens according to an embodiment of the present technology, a first lens group having a positive refracting power, a second lens group having a negative refracting power, a third lens group having a positive refracting power, and a fourth lens group having a positive refracting power which are arranged in order from an object side to an image side.

When the zoom lens according to the embodiment of the present technology is zoomed from a wide-angle end state to a telephoto end state, the first lens group is moved toward the object side so that the distance between the first and second lens groups increases and the third lens group is moved toward the object side so that the distance between the second and third lens groups decreases.

When the zoom lens has the above-described configuration, it is possible to improve a variable magnifying power effect by the second and third lens groups and also shorten the entire length of an optical system.

Since a field angle is wide in the wide-angle end state, an off-axis luminous flux passing through the first and second lens groups becomes distant from an optical axis. Therefore, the off-axis luminous flux passing through the first lens group is made not to be too wide by disposing the first and second lens groups closely.

When the position of the zoom lens is changed from the wide-angle end state to the telephoto end state, the field angle is narrowed. Further, when an aperture stop is disposed near the third lens group, that is, between the second and third lens groups, or in the third lens group, the second lens group becomes close to the aperture stop. Therefore, the off-axis luminous flux passing through the first and second lens groups becomes close to the optical axis. By using the change in the height of the off-axis luminous flux passing through the first and second lens groups, it is possible to satisfactorily correct a variation in an off-axis aberration caused by the change in the lens position state.

Accordingly, the miniaturization of the zoom lens is achieved and an excellent optical performance can be ensured in the entire zoom region.

In the zoom lens according to the embodiment of the present technology, the second lens group includes three lenses, that is, a negative lens, a positive lens, and a negative lens arranged in order from the object side to the image side.

By disposing the three lenses in a symmetric shape of the positive, negative, and positive lenses, the negative refracting power can be reinforced while satisfactorily correcting off-axis aberration such as distortion aberration or astigmatism in the entire zoom region. Accordingly, it is possible to simultaneously suppress aberration variation caused due to movement of the second lens group and realize highly variable magnifying power.

In order to realize the highly variable magnifying power of the zoom lens, the negative refracting power of the second lens group has to be reinforced. In the zoom lens according to the embodiment of the present technology, accordingly, the second lens group includes a single negative lens as a first sub-group and positive and negative lenses as a second sub-lens group.

Since in the wide-angle end state, the first sub-group is distant from the aperture stop disposed near the third lens group, that is, between the second and third lens groups or in the third lens group, the height of the light beam passing by a change in the field angle is considerably changed. Therefore, the first sub-group has a function of satisfactorily correcting the off-axis aberration such as distortion aberration or astigmatism in the entire zoom region.

Since the second sub-group is disposed near the aperture stop, the second sub-group has a function of mainly correcting spherical aberration. By cancelling various aberrations generated in the negative lens of the first sub-group, it is possible to suppress the aberration generated in the second lens group.

Further, the second sub-group includes a single positive lens and a single negative lens in order to reduce the burden on the aberration correction of the negative lens of the first sub-group. When the second sub-group includes two lenses or one lens, it is possible to control the thickness of the second lens group in an optical axis direction. The movement amount of the second lens group is sufficiently ensured, thereby contributing to the high variable magnifying power.

Further, when the second sub-group is configured by a cemented lens of the positive and negative lenses, it is possible to reduce sensitivity to manufacturing errors and also improve assembling workability.

In the zoom lens according to the embodiment of the present technology, the third lens group includes three lenses, that is, a positive lens, a negative lens, and a positive lens arranged in order from the object side to the image side.

By disposing the three lenses in a symmetric shape of the positive, negative, and positive lenses, the positive refracting power can be reinforced while satisfactorily correcting spherical aberration in the entire zoom region. Accordingly, it is possible to simultaneously suppress aberration variation caused due to movement of the third lens group and realize highly variable magnifying power. By configuring the positive and negative lenses as the cemented lens on the object side, it is possible to reduce the manufacturing error of the positive and negative lenses cancelling the aberration on the object side. Accordingly, the excellent optical performance can easily be ensured.

When the zoom lens according to the embodiment of the present technology has the above-described configuration, the zoom lens has the excellent optical performance in the entire zoom region. Accordingly, the zoom lens can realize the field angle of 80 degrees and the variable magnifying power of 15-fold in the wide-angle end state, thereby realizing miniaturization, highly variable magnifying power, and high performance.

In the zoom lens according to an embodiment of the present technology, it is desirable that Condition Equation (1) below is satisfied:

$$0.06 < |f2/ft1| < 0.12, \tag{1}$$

where f2 is a focal distance of the second lens group and ft is a focal distance of the entire lens system at the telephoto end.

Condition Equation (1) is an equation that defines a desirable ratio of the focal distance of the second lens group to the focal distance of the entire lens system at the telephoto end in order to obtain a predetermined optical performance.

When Condition Equation (1) is less than the lower limit, the negative refracting power of the second lens group becomes too strong. Therefore, it is difficult to correct the off-axis aberration such as astigmatism generated in the second lens group in the entire zoom region. For this reason, the aberration variation caused by zooming is increased, thereby deteriorating the off-axis aberration both at the wide-angle end and the telephoto end.

On the contrary, when Condition Equation (1) is greater than the upper limit, the negative refracting power of the second lens group becomes too weak. Therefore, a desired variable magnification ratio may not be ensured. Further, since the movement amount of the third lens groups has to be increased to increase the variable magnification ratio, it is difficult to realize the miniaturization of the optical system.

Accordingly, when the zoom lens satisfies Condition Equation (1), the aberration variation caused by the zooming can be reduced and the miniaturization can be realized.

In Condition Equation (1), it is more desirable that the lower limit is set to 0.08 and the upper limit is set to 0.10.

In the zoom lens according to an embodiment of the present technology, it is desirable that Condition Equation (2) below is satisfied:

$$0.10 < f3/ft < 0.25, \tag{2}$$

where f3 is the focal distance of the third lens group and ft is the focal distance of the entire lens system at the telephoto end.

Condition Equation (2) is an equation that defines a desirable ratio of the focal distance of the third lens group to the focal distance of the entire lens system at the telephoto end in order to obtain the predetermined optical performance.

When Condition Equation (2) is less than the lower limit, the positive refracting power of the third lens group becomes too strong. Therefore, spherical aberration and coma aberration increase at the zooming, thereby achieving no high performance.

On the contrary, when Condition Equation (2) is greater than the upper limit, the movement amount of the third lens groups has to be increased to ensure a desired variable magnification ratio. Therefore, it is difficult to realize the miniaturization of the optical system.

Accordingly, when the zoom lens satisfies Condition Equation (2), the spherical aberration and the coma aberration caused at the zooming can be suppressed. Accordingly, a high performance can be achieved and the miniaturization can be realized.

In Condition Equation (2), it is more desirable that the lower limit is set to 0.15 and the upper limit is set to 0.2.

In the zoom lens according to an embodiment of the present technology, it is desirable that Condition Equation (3) below is satisfied:

$$0.9 < f21/f2 < 1.4, \quad (3)$$

where f21 is a focal distance of a negative lens disposed closest to the object side in the second lens group and f2 is a focal distance of the second lens group.

Condition Equation (3) is an equation that defines a ratio of the focal distance of the first sub-lens group of the second lens group to the focal distance of the second lens group.

When Condition Equation (3) is less than the lower limit, the refracting power of the first sub-group of the second lens group becomes too strong. Therefore, it is difficult to correct the off-axis aberration such as astigmatism generated in the second lens group at the wide-angle end. Moreover, since the sensitivity to manufacturing errors of the first and second sub-groups is increased, the performance may be caused at the manufacturing time.

On the contrary, when Condition Equation (3) is greater than the upper limit, the refracting power of the first sub-group of the second lens group becomes too weak. Therefore, since an off-axis luminous flux passing through the first sub-group of the second lens group or the first lens group at the wide-angle end is distant from the optical axis, the lens diameter may be too increased and the off-axis aberration may deteriorate.

Accordingly, when the zoom lens satisfies Condition Equation (3), the off-axis aberration can be corrected satisfactorily and the reduction in the sensitivity to the manufacturing errors and the miniaturization are realized.

In Condition Equation (3), it is more desirable that the lower limit is set to 1.0 and the upper limit is set to 1.2.

In the zoom lens according to an embodiment of the present technology, it is desirable that Condition Equation (4) below is satisfied:

$$0.50 < f1/ft < 0.65, \quad (4)$$

where f1 is a focal distance of the first lens group and ft is a focal distance of the entire lens system at the telephoto end.

Condition Equation (4) is an equation that defines a ratio of the focal distance of the first lens group to the focal distance of the entire lens system in the wide-angle end state.

When Condition Equation (4) is less than the lower limit, the refracting power of the first lens group becomes too strong. Therefore, the coma aberration or the astigmatism is considerably generated at the telephoto end, and thus it is difficult to correct the aberration of the entire lens system.

On the contrary, when Condition Equation (4) is greater than the upper limit, the refracting power of the first lens group becomes too weak. Therefore, it is difficult to realize the miniaturization and the wide angle of the first lens group.

Accordingly, when the zoom lens satisfies Condition Equation (4), the coma aberration or the astigmatism at the telephoto end can be suppressed. Accordingly, the aberration can be corrected satisfactorily in the entire lens system, and the miniaturization and the wide angle of the first lens group can be also realized.

In Condition Equation (4), it is more desirable that the lower limit is set to 0.55 and the upper limit is set to 0.60.

In the zoom lens according to an embodiment of the present technology, it is desirable that Condition Equation (5) below is satisfied:

$$0.4 < d31/D3 < 0.8, \quad (5)$$

where d31 is a thickness of the positive lens disposed closest to the object side in the third lens group and D3 is a thickness of the entire third lens group along an optical axis.

Condition Equation (5) is an equation that defines a ratio of the thickness of the entire third lens group along the optical axis to the thickness of the positive lens disposed closest to the object side in the third lens group.

When Condition Equation (5) is less than the lower limit, the refracting power of the positive lens disposed closest to the object side in the third lens group becomes too strong. Therefore, since the variable magnifying power effect obtained by moving the third lens group is not sufficient, it is difficult to achieve the highly variable magnifying power.

On the contrary, when Condition Equation (5) is greater than the upper limit, the positive lens disposed closest to the objet side in the third lens group is too distant from the negative lens disposed on the image side more than this positive lens. Therefore, the spherical aberration may not satisfactorily be cancelled in both positive and negative lenses.

Accordingly, when the zoom lens satisfies Condition Equation (5), the spherical aberration can be suppressed from being generated. Accordingly, the highly variable magnifying power can be realized.

In Condition Equation (5), it is more desirable that the lower limit is set to 0.6 and the upper limit is set to 0.7.

In the zoom lens according to an embodiment of the present technology, it is desirable that Condition Equation (6) below is satisfied:

$$0.9 < Lt/ft < 1.3, \quad (6)$$

where Lt is an entire length of the lens system in a telephoto end and ft is a focal distance of the entire lens system at the telephoto end.

Condition Equation (6) is an equation that defines a ratio of the length of the entire lens group in the telephoto end state to the focal distance in the telephoto end.

When Condition Equation (6) is less than the lower limit, the refracting power of each group has to be reinforced to decrease the entire length of the lens in the telephoto end state. Therefore, since the sensitivity to the manufacturing errors of the respective groups is increased, it is not desirable to reinforce the refracting power of each group in terms of the manufacture. Further, it is difficult to satisfactorily correct the aberration in the entire zoom region.

On the contrary, when Condition Equation (6) is greater than the upper limit, the entire length of the lens in the telephoto end state increases, thereby deteriorating the miniaturization.

Accordingly, when the zoom lens satisfies Condition Equation (6), it is possible to realize the excellent optical performance in the entire zoom region and the miniaturization.

In Condition Equation (6), it is more desirable that the lower limit is set to 1.0 and the upper limit is set to 1.2.

In the zoom lens according to an embodiment of the present technology, it is desirable that the first lens group preferably includes three lenses, that is, a negative lens, a positive lens, and a positive lens arranged in order from the object side to the image side.

When the first lens group of the zoom lens has the above-described configuration, the positive refracting power of the first lens group can be distributed to the two positive lenses and the curvatures of the lenses can be loose. Therefore, it is possible to suppress the generation of the aberration of an off-axis light beam passing through a position distant from the optical axis at the wide-angle end. Further, the coma thickness can be ensured even when the thickness of the positive lens is increased. Therefore, since the thickness of the positive lens in the optical axis direction can be made to be thin, the miniaturization of the optical system can be realized.

In the zoom lens according to an embodiment of the present technology, it is desirable that Condition Equation (7) below is satisfied:

$$8 < ft/fw < 20, \quad (7)$$

where ft is a focal distance of the entire lens system at a telephoto end and fw is a focal distance of the entire lens system at a wide-angle end.

Condition Equation (7) is an equation that defines the variable magnification ratio of the optical system.

When Condition Equation (7) is less than the lower limit, the highly variable magnifying power can be realized.

On the contrary, when Condition Equation (7) is greater than the upper limit, the size of the optical system may be increased.

Accordingly, when the zoom lens satisfies Condition Equation (7), the miniaturization of the optical system and the highly variable magnifying power can be realized.

In Condition Equation (7), it is more desirable that the lower limit is set to 12 and the upper limit is set to 16.

In the zoom lens according to an embodiment of the present technology, each lens group can be configured as follows to ensure the excellent optical system and to realize the wide angle, the highly variable magnifying power, and the miniaturization.

In the first lens group, it is desirable that a negative meniscus lens with a convex surface facing the object side, a positive lens, and a positive meniscus lens with a convex surface facing the object side are disposed in order from the object side to the image side.

In regard to the positive lens on the object side in the first lens group, for example, it is desirable to use a glass material with the Abbe number of 60 or more. The chromatic aberration is suppressed more easily with an increase in the Abbe number.

In the first lens group, particularly, the spherical aberration is easily generated, when an on-axis luminous flux is incident with a large diameter at the telephoto end. Further, the off-axis aberration such as coma aberration or astigmatism is easily generated, when the off-axis luminous flux is incident at a position distant from the optical axis.

Accordingly, by configuring the positive lens on the image side in the first lens group as the meniscus lens with the convex surface facing the object side, it is possible to decrease the incident angle of the off-axis light beam with respect to the lens at the wide-angle end, thereby suppressing the generation of the aberration.

It is desirable that the second lens group includes first and second sub-groups. When the second lens group includes the first and second sub-groups, various aberrations generated in the second lens group can be corrected more satisfactorily, and thus the higher optical performance can be ensured.

In the third lens group, it is desirable that the positive lens with the convex surface facing the object side is disposed closest to the object side.

When the positive lens with the convex surface facing the object side is disposed closest to the object side in the third lens group, the spherical aberration can be corrected satisfactorily even in the case where the third lens group has the strong refracting power. Further, when the convex surface facing the object side is configured as an aspherical surface, the spherical aberration can be corrected more satisfactorily.

It is desirable that the fourth lens group is configured by a single lens and is used to perform focusing.

When the fourth lens group is configured by the single lens, a burden on a driving mechanism being moved to perform the focusing can be suppressed as small as possible. Further, when at least one of the surfaces of the fourth lens group is configured as an aspherical surface, the variation in various aberrations caused in the focusing can be corrected satisfactorily.

In the zoom lens, the position of an image can be shifted by shifting one lens group among the first to fourth lens groups or one lens in one lens group in a direction substantially perpendicular to the optical axis.

By combining the zoom lens capable of shifting the position of an image with a detecting system capable of detecting image blurring, a driving system capable of shifting each lens group, and a control system capable of providing a shift amount to the driving system based on the output of the detecting system, the zoom lens can function as a variation control optical system correcting hand shake or image blurring.

In order to prevent a moire stripe from being generated, a lowpass filter is disposed above the lens system or an infrared absorbing filter may be disposed in accordance with the spectral sensitivity characteristics of a light-receiving element.

In the zoom lens according to an embodiment of the present technology, barrel-shaped distortion aberration is easily generated at the wide-angle end due to the high height of the light beam passing through the negative lens of the first sub-group of the second lens group at the wide-angle end. Accordingly, it is desirable to correct and observe the image blurring caused due to the distortion aberration generated in the optical system by using a function of processing captured-image data and changing the image blurring. Further, the height of the incident light beam at the wide-angle end is lower than the field angle by intentionally generating the barrel-shaped distortion aberration. Therefore, since the diameter of the first lens can be made to be small, the miniaturization can be realized.

Numerical Examples of Zoom Lens

Hereinafter, specific examples of the zoom lens according to the embodiment of the present technology and numerical examples in which the specific numerical values are applied will be described with reference to the drawings and the tables.

The meanings of the following tables and the signs used in the description are as follows.

"Si" denotes a surface number of an i-th surface present from the object side to the image side, "Ri" denotes a paraxial curvature radius of the i-th surface, "Di" denotes an on-axial surface distance (thickness or air distance of the center of a lens) between the i-th surface and the i+1-th surface, "Ni" denotes a refractive index of a lens starting from the i-th surface along a d line (λ=587.6 nm), and "vi" denotes the Abbe number of the lens starting from the i-th surface along the d line.

In regard to "Si", "ASP" indicates that the corresponding surface is an aspherical surface. In regard to "Ri", "0.0000" indicates that the corresponding surface is a plane surface.

"K" denotes a cone constant (conic constant) and "A", "B", "C", and "D" denote the fourth, sixth, eighth, and tenth order aspherical coefficients, respectively.

"f" denotes a focal distance, "Fno" denotes F number, and "ω" denotes a half field angle.

Further, in the tables indicating the following aspherical coefficients, "E-n" denotes an exponential notation of the base 10, that is, "10 to the minus n power.". For example, "0.12345E-05" represents "0.12345×$10^{-5}$."

The zoom lens used in each embodiment, the lens surface is formed as an aspherical surface. On the assumption that "x" is a distance (sag amount) from the apex of a lens surface in an optical axis direction, "y" is a height (image height) in a direction perpendicular to the optical axis direction, "c" is a paraxial curvature (the reciprocal of a curvature radius) in the apex of a lens, "K" is a cone constant (conic constant), and "A", "B", "C", and "D" are the fourth, sixth, eighth, and tenth order aspherical coefficients, respectively, the aspherical surface is defined by Equation 1 below.

$$x = \frac{cy^2}{1 + \{1 - (1+\kappa)c^2y^2\}^{1/2}} + Ay^4 + By^6 + \ldots \qquad \text{Equation 1}$$

FIGS. 1, 5, 9, and 13 are diagrams illustrating the configurations of zoom lenses 1 to 4 according to first to fourth embodiments of the present technology.

In each diagram, the upper part illustrates a wide-angle end state, the middle part illustrates an intermediate focal distance state, and the lower part illustrates a telephoto end state. As the focal distance approximates from the wide-angle end to the telephoto end, each lens group is located at a position indicated by an arrow. The solid line arrow indicates that each lens group moves at the zooming time.

First Embodiment

FIG. 1 is a diagram illustrating the configuration of the zoom lens 1 according to a first embodiment of the present technology.

In the zoom lens 1, a first lens group GR1 having a positive refracting power, a second lens group GR2 having a negative refracting power, a third lens group GR3 having a positive refracting power, and a fourth lens group GR4 having a positive refracting power are arranged in order from the object side to the image side.

The variable magnifying ratio of the zoom lens 1 is set to 14.1-fold.

In the first lens group GR1, a cemented lens, which is formed by joining a meniscus-shaped negative lens G1 with a convex surface facing the object side and a positive lens G2 with a biconvex shape, and a meniscus-shaped positive lens G3 with a convex surface facing the object side are arranged in order from the object side to the image side.

In the second lens group GR2, a meniscus-shaped negative lens G4 with a convex surface facing the object side and a cemented lens, which is formed by joining a positive lens G5 with a biconvex shape and a negative lens G6 with a biconcave shape, are arranged in order from the object side to the image side.

In the third lens group GR3, a cemented lens, which is formed by joining a positive lens G7 with a biconvex shape and a negative lens G8 with a biconcave shape, and a positive lens G9 with a biconvex shape are arranged in order from the objet side to the image side.

The fourth lens group GR4 includes a meniscus-shaped positive lens G10 with a convex surface facing the object side.

Between the fourth lens group GR4 and an image surface IMG, a filter FL and a cover glass CG are arranged in order from the object side to the image side.

An aperture stop S is disposed near the third lens group GR3 on the object side and is moved together with the third lens group GR3.

At the zooming time, the first lens group GR1, the second lens group GR2, the third lens group GR3, and the fourth lens group GR4 are configured as a moving lens group.

Table 1 shows lens data of Numerical Example 1 in which specific numerical values are applied to the zoom lens 1 according to the first embodiment.

TABLE 1

| Si | Ri | Di | Ni | vi |
|---|---|---|---|---|
| 1 | 58.8750 | 0.800 | 1.84670 | 23.78 |
| 2 | 27.3444 | 3.000 | 1.59280 | 68.62 |
| 3 | −481.5559 | 0.100 | | |
| 4 | 25.6209 | 2.019 | 1.80420 | 46.50 |
| 5 | 76.9104 | (D5) | | |
| 6(ASP) | 24.3225 | 0.600 | 1.88200 | 37.23 |
| 7(ASP) | 4.3171 | 3.066 | | |
| 8 | 74.3184 | 1.777 | 1.94590 | 17.98 |
| 9 | −12.1338 | 0.450 | 1.88200 | 37.23 |
| 10(ASP) | 48.3075 | (D10) | | |
| 11 | 0.0000 | 0.150 | (APERTURE STOP) | |
| 12(ASP) | 6.0065 | 4.019 | 1.68890 | 31.16 |
| 13 | −35.1430 | 0.500 | 1.92290 | 20.88 |
| 14 | 6.3710 | 0.215 | | |
| 15 | 11.3852 | 1.167 | 1.65840 | 50.85 |
| 16 | −11.8031 | (D16) | | |
| 17(ASP) | 11.5915 | 1.065 | 1.49710 | 81.56 |
| 18 | 29.6720 | (D18) | | |
| 19 | 0.0000 | 0.100 | 1.51200 | 56.89 |
| 20 | 0.0000 | 1.000 | | |
| 21 | 0.0000 | 0.300 | 1.55670 | 58.56 |
| 22 | 0.0000 | 0.500 | | |

In the zoom lens 1, both surfaces (sixth and seventh surfaces) of a negative lens G4 of the second lens group GR2, the surface (tenth surface) of a negative lens G6 facing the image side, the surface (twelfth surface) of the positive lens G7 of the third lens group GR3 facing the object side, and the surface (seventeenth surface) of the positive lens G10 of the fourth lens group GR4 facing the object side are configured as aspherical surfaces. Table 2 shows the fourth, sixth, eighth, and tenth order aspherical coefficients "A", "B", "C", and "D" of the aspherical surfaces and the cone constant "K" in Numeral Example 1.

TABLE 2

| Si | κ | A | B | C | D |
|---|---|---|---|---|---|
| 6 | 1.44561E+00 | −4.43191E−04 | 1.58469E−06 | 1.45572E−08 | −6.26148E−11 |
| 7 | −7.08602E−01 | 6.73608E−04 | 1.17893E−05 | −3.34486E−08 | −1.99461E−10 |
| 10 | 1.01305E−01 | −5.38422E−04 | 1.73186E−06 | −3.43891E−07 | −1.68703E−09 |
| 12 | −3.31599E−01 | −1.98809E−04 | 1.90938E−06 | −9.30317E−09 | −5.09591E−12 |
| 17 | −4.33039E−01 | −6.54983E−05 | 4.57366E−06 | −1.22524E−07 | −2.34642E−10 |

Table 3 shows the F number Fno and the half field angle ω in the wide-angle end state, the intermediate focal distance state, and the telephoto end state in Numerical Example 1.

TABLE 3

| | WIDE-ANGLE END | INTERMEDIATE FOCAL DISTANCE | TELEPHOTO END |
|---|---|---|---|
| f | 4.38 | 16.39 | 61.84 |
| Fno | 3.62 | 4.99 | 5.77 |
| ω | 41.55 | 13.33 | 3.59 |

In the zoom lens 1, the surface distance D5 between the first lens group GR1 and the second lens group GR2, the surface distance D10 between the second lens group GR2 and the aperture stop S, the surface distance D16 between the third lens group GR3 and the fourth lens group GR4, and the surface distance D18 between the fourth lens group GR4 and the filter FL are changed, when the magnification is changed between the wide-angle end state and the telephoto end state. Table 4 shows variable distances of the respective surface distances in the wide-angle end state, the intermediate focal distance state, and the telephoto end state in Numerical Example 1.

TABLE 4

| | WIDE-ANGLE END | INTERMEDIATE FOCAL DISTANCE | TELEPHOTO END |
|---|---|---|---|
| f | 4.38 | 16.39 | 61.84 |
| D5 | 0.300 | 12.380 | 23.143 |
| D10 | 15.960 | 5.512 | 0.350 |
| D16 | 3.876 | 6.301 | 14.575 |
| D18 | 6.773 | 11.917 | 8.605 |

Figure 2:
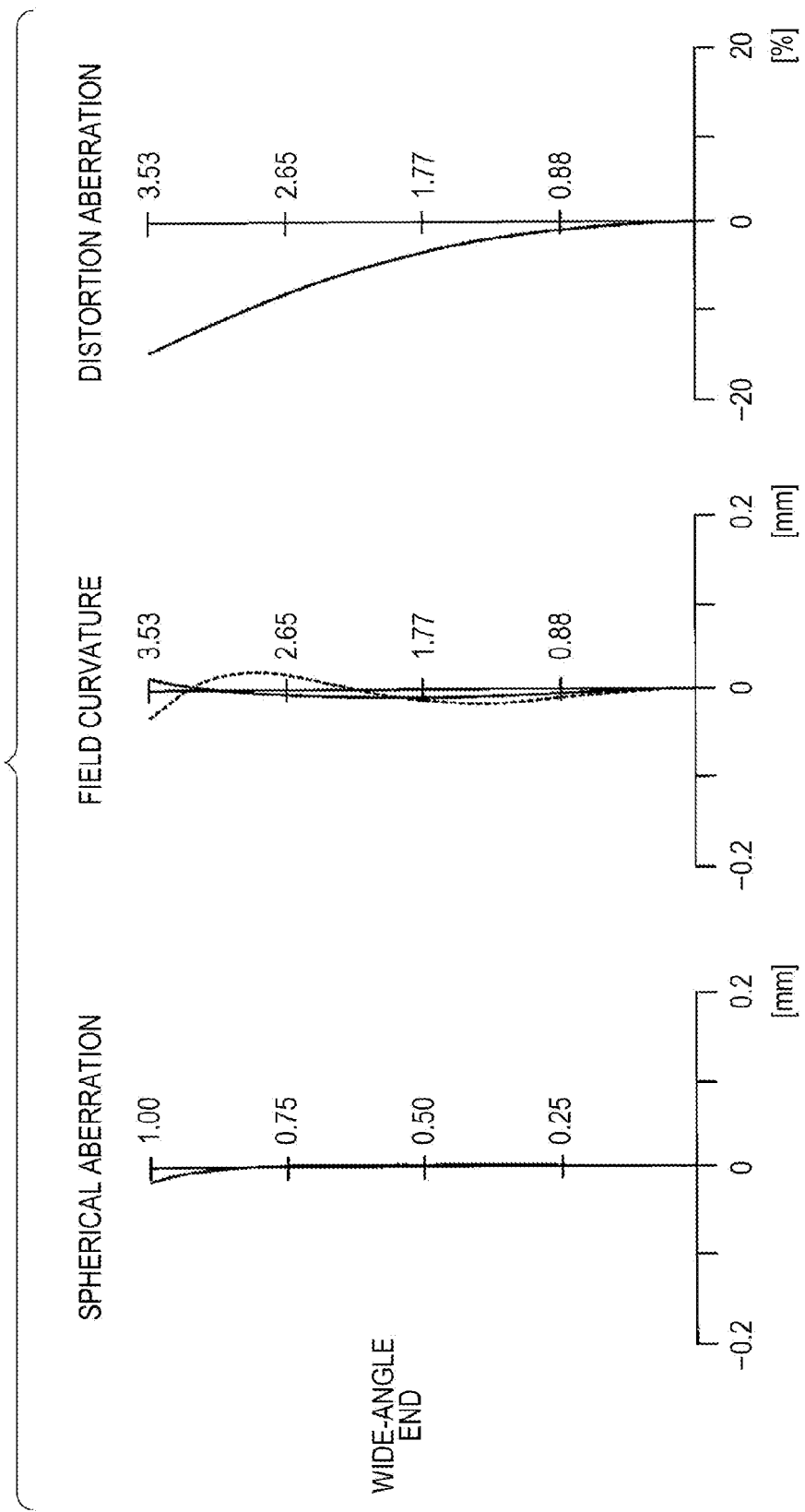
FIG. 2 is a diagram illustrating aberrations together with FIGS. 3 and 4 in an numerical example in which specific numerical values are applied according to the first embodiment and illustrating spherical aberration, field curvature, and distortion aberration in a wide-angle end state.
Figure 3:
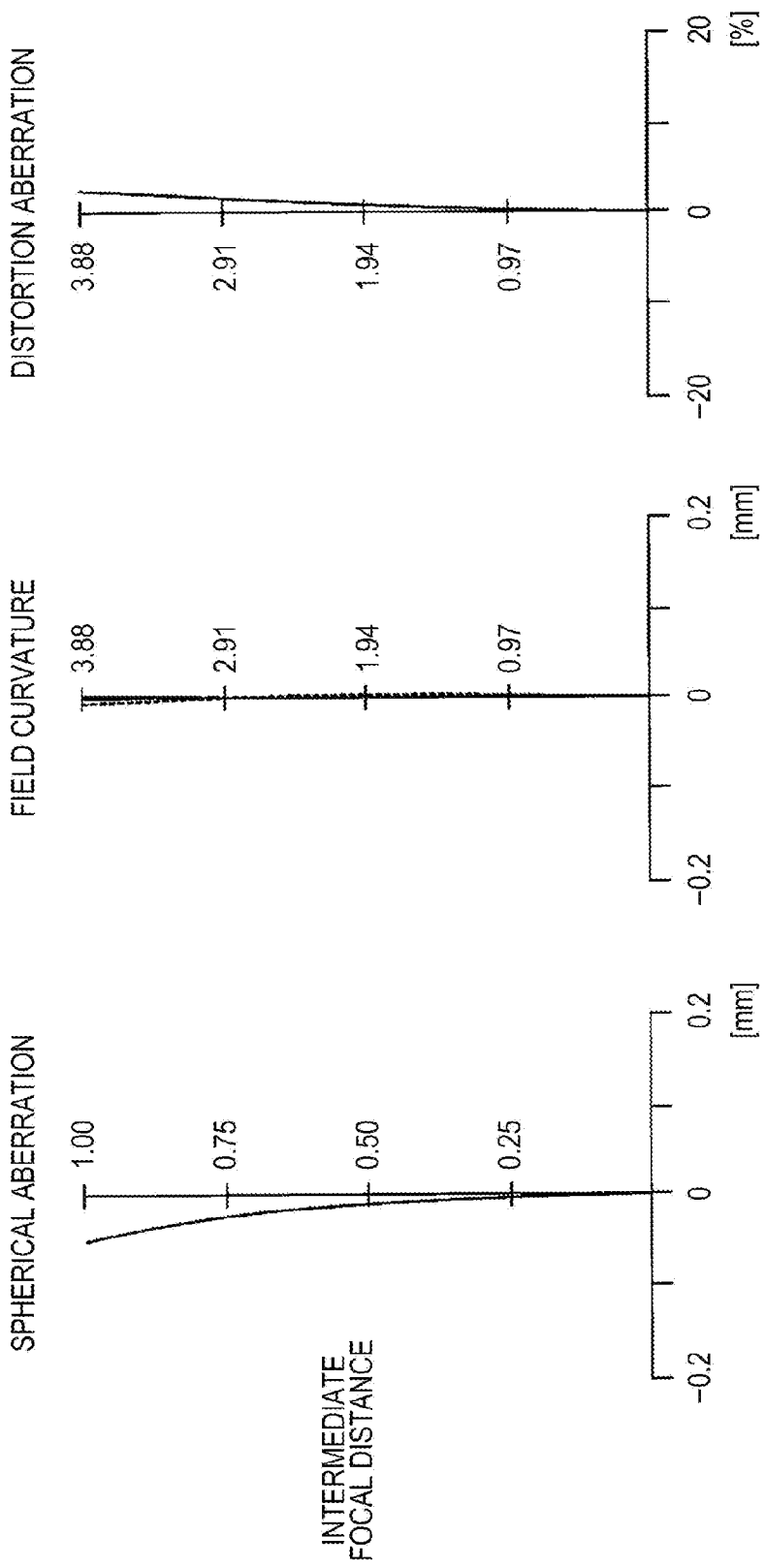
FIG. 3 is a diagram illustrating the spherical aberration, the field curvature, and the distortion aberration in an intermediate focal distance state.
Figure 4:
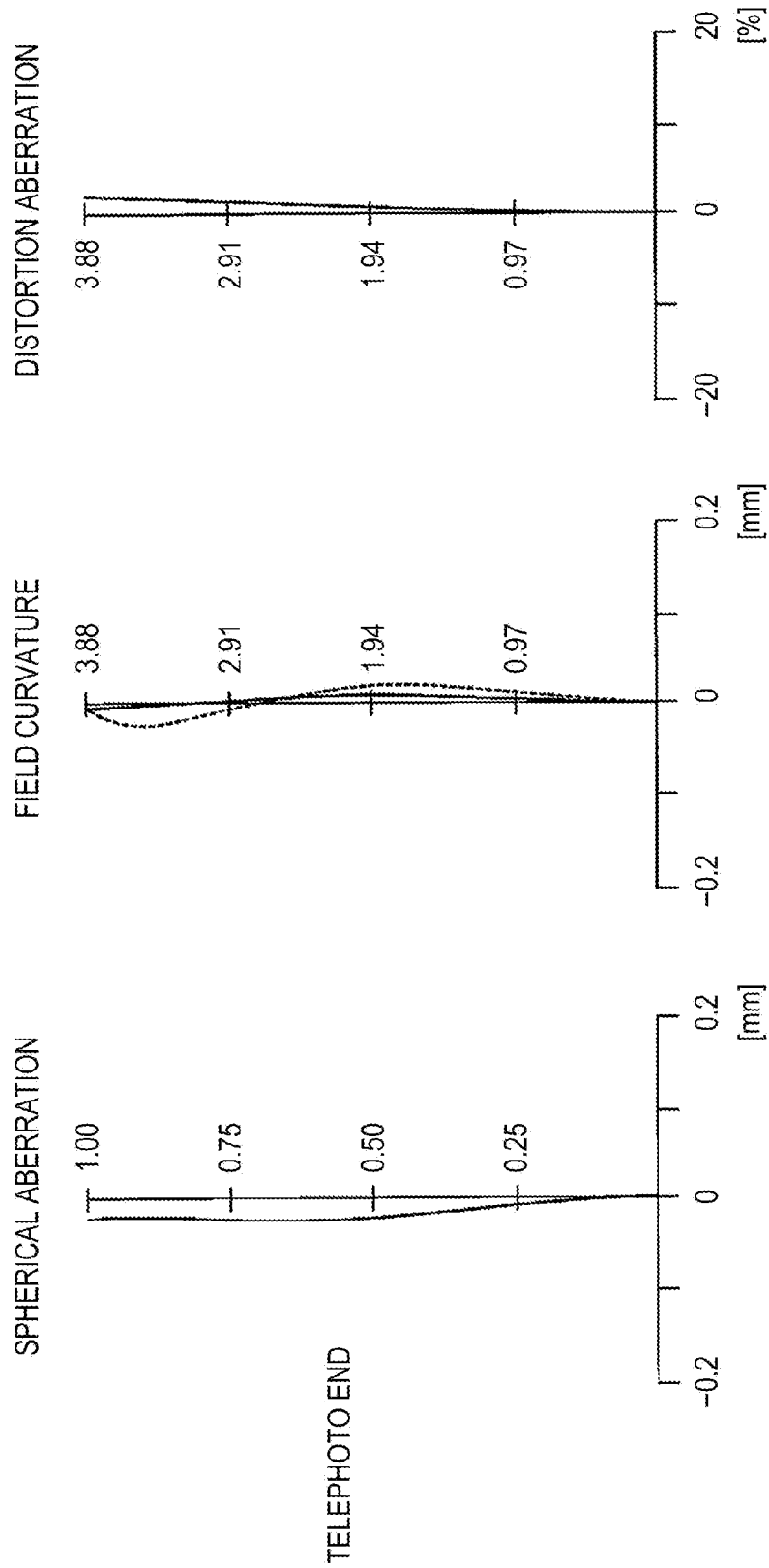
FIG. 4 is a diagram illustrating the spherical aberration, the field curvature, and the distortion aberration in a telephoto end state.

FIGS. 2 to 4 are diagrams illustrating various aberrations in an infinite focusing state of Numerical Example 1. FIG. 2 shows an aberration in the wide-angle end state, FIG. 3 shows an aberration in the intermediate focal distance state, and FIG. 4 shows an aberration in the telephoto end state.

In FIGS. 2 to 4, a solid line indicates a value on a sagittal image plane and a dashed line indicates a value on a meridional image plane in the field curvature diagram.

From each aberration diagram, in Numerical Example 1, it is apparent that various aberrations are satisfactorily corrected and an excellent imaging performance is realized.

Second Embodiment

Figure 5:
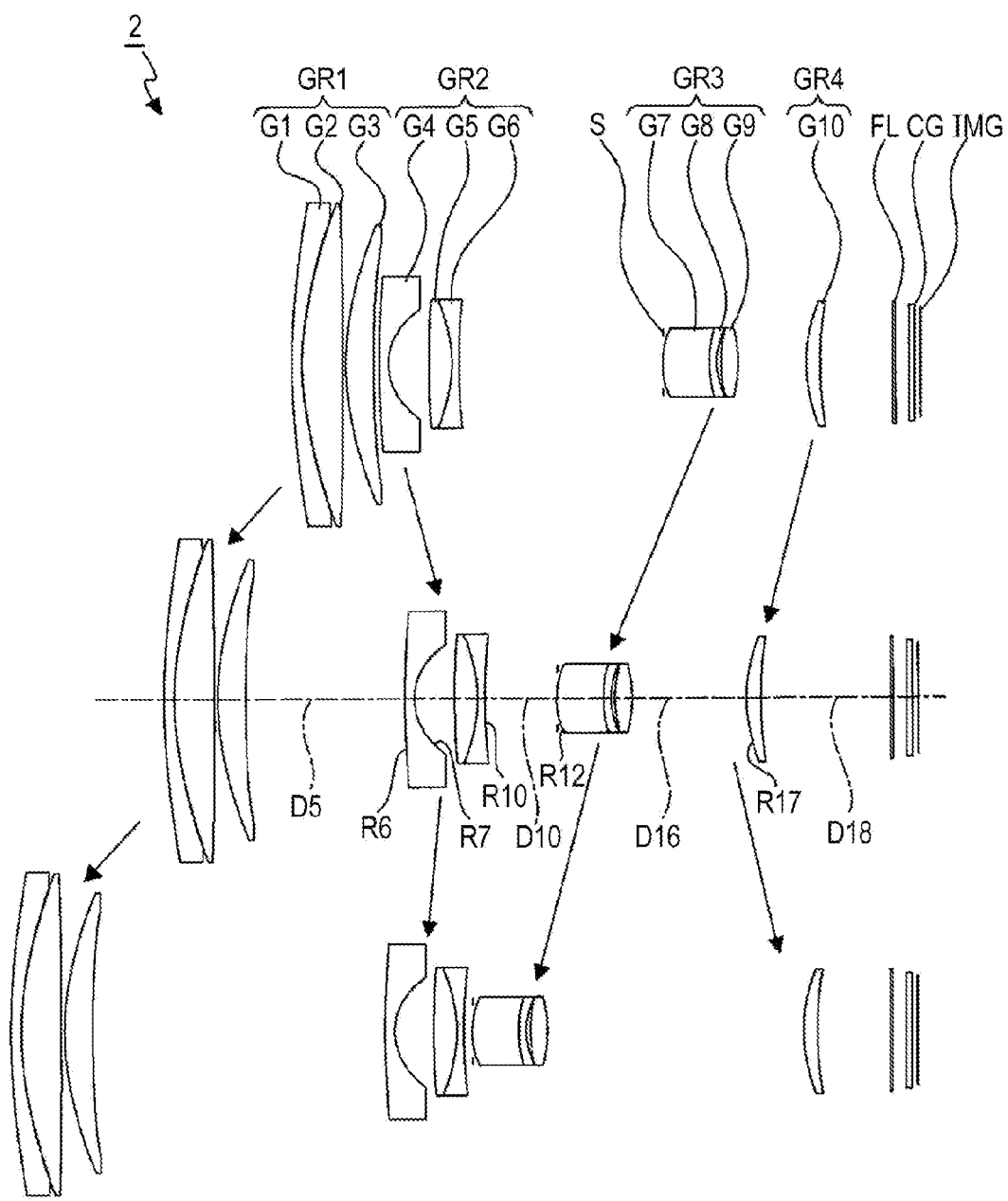
FIG. 5 is a diagram illustrating the configuration of a zoom lens according to a second embodiment.

FIG. 5 is a diagram illustrating the configuration of the zoom lens 2 according to a second embodiment of the present technology.

In the zoom lens 2, a first lens group GR1 having a positive refracting power, a second lens group GR2 having a negative refracting power, a third lens group GR3 having a positive refracting power, and a fourth lens group GR4 having a positive refracting power are arranged in order from the object side to the image side.

The variable magnifying ratio of the zoom lens 2 is set to 14.2-fold.

In the first lens group GR1, a cemented lens, which is formed by joining a meniscus-shaped negative lens G1 with a convex surface facing the object side and a positive lens G2 with a biconvex shape, and a meniscus-shaped positive lens G3 with a convex surface facing the object side are arranged in order from the object side to the image side.

In the second lens group GR2, a meniscus-shaped negative lens G4 with a convex surface facing the object side and a cemented lens, which is formed by joining a positive lens G5 with a biconvex shape and a negative lens G6 with a biconcave shape, are arranged in order from the object side to the image side.

In the third lens group GR3, a cemented lens, which is formed by joining a meniscus-shaped positive lens G7 with a convex surface facing the object side and a meniscus-shaped negative lens G8 with a convex surface facing the object side, and a positive lens G9 with a biconvex shape are arranged in order from the object side to the image side.

The fourth lens group GR4 includes a meniscus-shaped positive lens G10 with a convex surface facing the object side.

Between the fourth lens group GR4 and an image surface IMG, a filter FL and a cover glass CG are arranged in order from the object side to the image side.

An aperture stop S is disposed near the third lens group GR3 on the object side and is moved together with the third lens group GR3.

At the zooming time, the first lens group GR1, the second lens group GR2, the third lens group GR3, and the fourth lens group GR4 are configured as a moving lens group.

Table 5 shows lens data of Numerical Example 2 in which specific numerical values are applied to the zoom lens 2 according to the second embodiment.

TABLE 5

| Si | Ri | Di | Ni | vi |
|---|---|---|---|---|
| 1 | 65.3230 | 0.800 | 1.84670 | 23.78 |
| 2 | 26.8232 | 3.225 | 1.59280 | 68.62 |
| 3 | −341.1044 | 0.150 | | |
| 4 | 26.2039 | 2.039 | 1.83480 | 42.72 |
| 5 | 92.0949 | (D5) | | |
| 6(ASP) | 25.3136 | 0.700 | 1.88200 | 37.23 |
| 7(ASP) | 4.4883 | 3.032 | | |
| 8 | 88.9690 | 1.872 | 1.94590 | 17.98 |
| 9 | −10.8637 | 0.550 | 1.88200 | 37.23 |
| 10(ASP) | 38.7931 | (D10) | | |
| 11 | 0.0000 | −0.150 | (APERTURE STOP) | |
| 12(ASP) | 5.8887 | 3.631 | 1.68890 | 31.16 |
| 13 | 20.9259 | 0.500 | 1.94590 | 17.98 |
| 14 | 6.1472 | 0.258 | | |
| 15 | 11.6874 | 1.253 | 1.61800 | 63.39 |
| 16 | −11.6874 | (D16) | | |
| 17(ASP) | 10.0205 | 1.218 | 1.49710 | 81.56 |
| 18 | 23.8852 | (D18) | | |
| 19 | 0.0000 | 0.100 | 1.51200 | 56.89 |
| 20 | 0.0000 | 1.000 | | |

TABLE 5-continued

| Si | Ri | Di | Ni | vi |
|---|---|---|---|---|
| 21 | 0.0000 | 0.500 | 1.55670 | 58.56 |
| 22 | 0.0000 | 0.300 | | |

In the zoom lens 2, both surfaces (sixth and seventh surfaces) of a negative lens G4 of the second lens group GR2, the surface (tenth surface) of a negative lens G6 facing the image side, the surface (twelfth surface) of the positive lens G7 of the third lens group GR3 facing the object side, and the surface (seventeenth surface) of the positive lens G10 of the fourth lens group GR4 facing the object side are configured as aspherical surfaces. Table 6 shows the fourth, sixth, eighth, and tenth order aspherical coefficients "A", "B", "C", and "D" of the aspherical surfaces and the cone constant "K" in Numeral Example 2.

TABLE 6

| Si | κ | A | B | C | D |
|---|---|---|---|---|---|
| 6 | −3.63571E+00 | −3.89224E−04 | 9.05768E−07 | 4.31652E−08 | −3.98897E−10 |
| 7 | −7.04129E−01 | 6.32478E−04 | 1.26877E−05 | −2.39401E−07 | −7.59200E−10 |
| 10 | −2.48647E+00 | −5.28758E−04 | 1.74668E−06 | −2.20963E−07 | −1.19395E−09 |
| 12 | −3.32977E−01 | −2.38092E−04 | 1.39446E−06 | 7.60235E−09 | 1.00663E−11 |
| 17 | −3.35029E−01 | −7.72129E−05 | 5.48915E−06 | −1.33371E−07 | 4.09007E−10 |

Table 7 shows the F number Fno and the half field angle ω in the wide-angle end state, the intermediate focal distance state, and the telephoto end state in Numerical Example 2.

TABLE 7

| | WIDE-ANGLE END | INTERMEDIATE FOCAL DISTANCE | TELEPHOTO END |
|---|---|---|---|
| f | 4.40 | 16.19 | 62.30 |
| Fno | 3.51 | 4.84 | 6.03 |
| ω | 41.39 | 13.48 | 3.57 |

In the zoom lens 2, the surface distance D5 between the first lens group GR1 and the second lens group GR2, the surface distance D10 between the second lens group GR2 and the aperture stop S, the surface distance D16 between the third lens group GR3 and the fourth lens group GR4, and the surface distance D18 between the fourth lens group GR4 and the filter FL are changed, when the magnification is changed between the wide-angle end state and the telephoto end state. Table 8 shows variable distances of the respective surface distances in the wide-angle end state, the intermediate focal distance state, and the telephoto end state in Numerical Example 2.

TABLE 8

| | WIDE-ANGLE END | INTERMEDIATE FOCAL DISTANCE | TELEPHOTO END |
|---|---|---|---|
| f | 4.40 | 16.19 | 62.30 |
| D5 | 0.40 | 12.01 | 22.11 |
| D10 | 15.24 | 5.41 | 0.55 |
| D16 | 5.03 | 8.51 | 19.02 |
| D18 | 5.59 | 9.91 | 5.64 |

Figure 6:
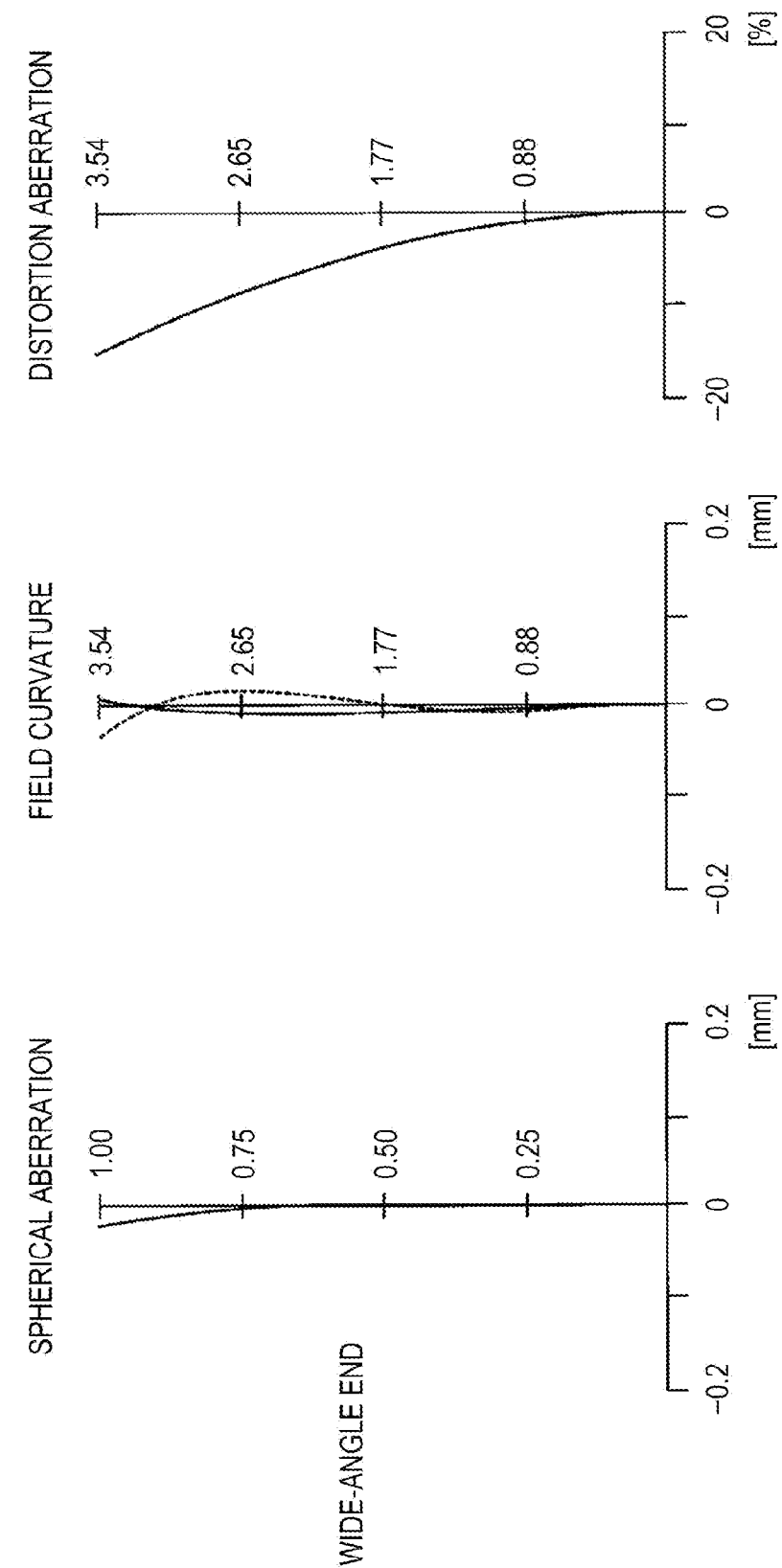
FIG. 6 is a diagram illustrating aberrations together with FIGS. 7 and 8 in an numerical example in which specific numerical values are applied according to the second embodiment and illustrating spherical aberration, field curvature, and distortion aberration in the wide-angle end state.
Figure 7:
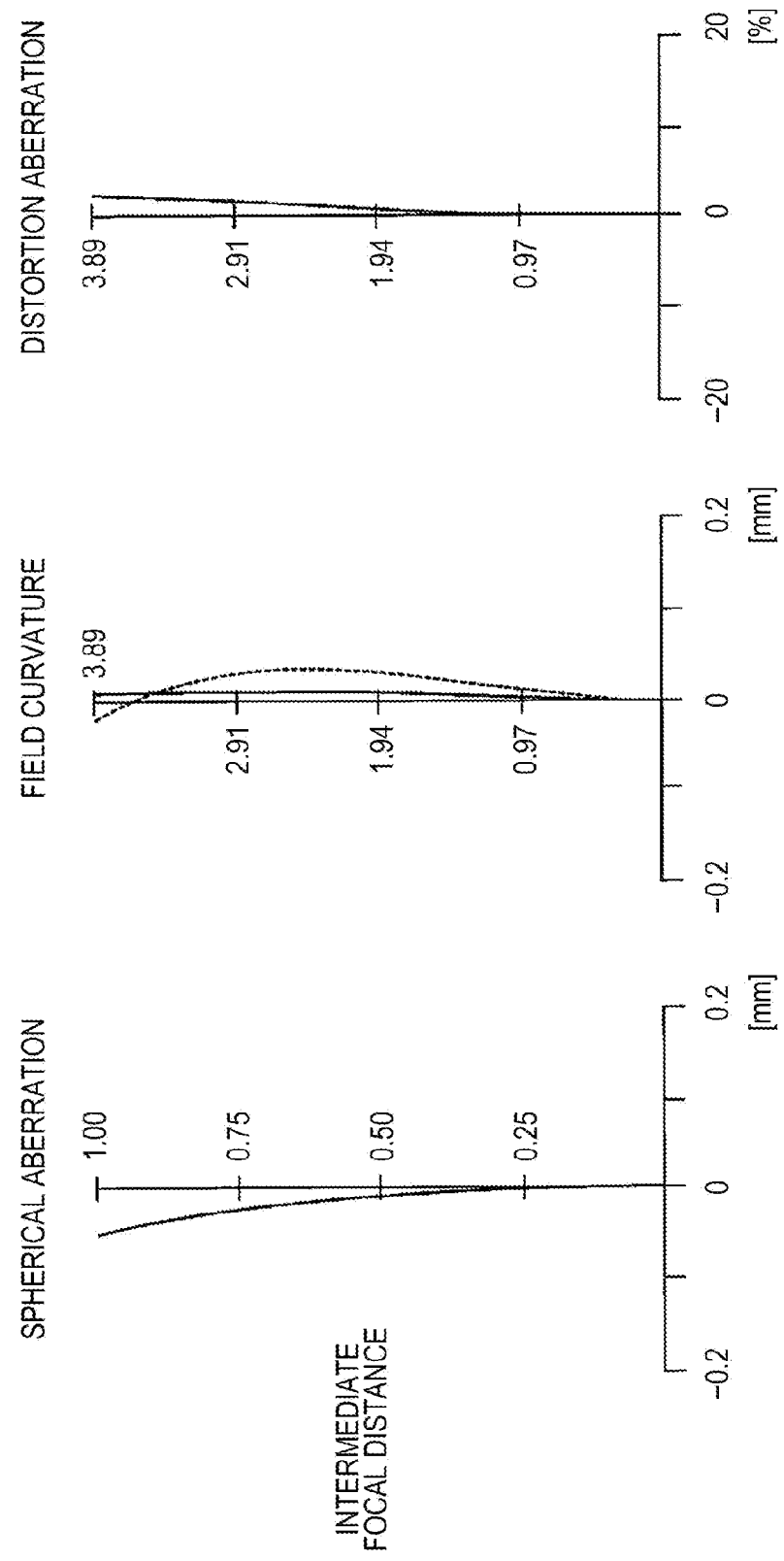
FIG. 7 is a diagram illustrating the spherical aberration, the field curvature, and the distortion aberration in the intermediate focal distance state.
Figure 8:
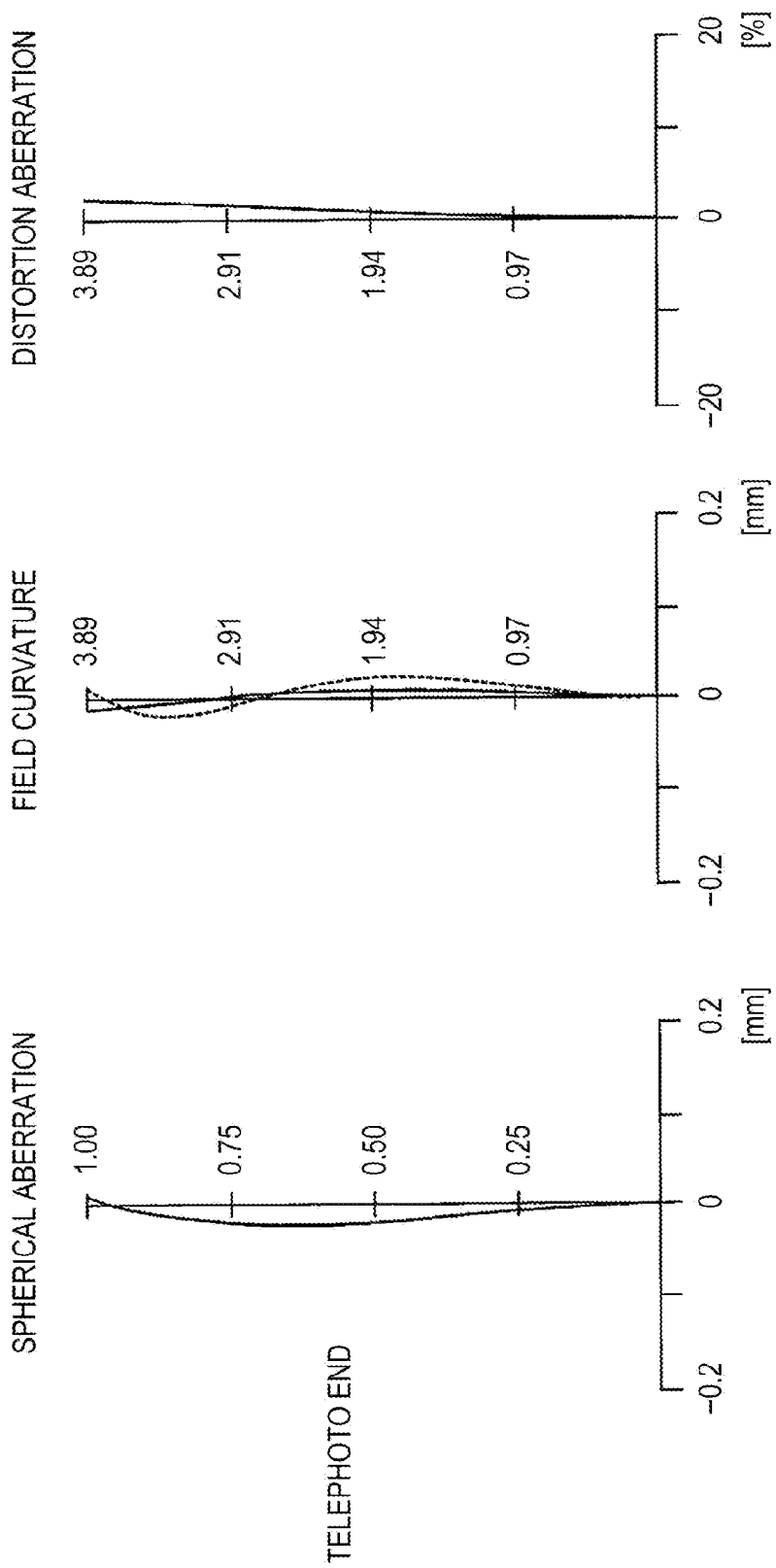
FIG. 8 is a diagram illustrating the spherical aberration, the field curvature, and the distortion aberration in the telephoto end state.

FIGS. 6 to 8 are diagrams illustrating various aberrations in an infinite focusing state of Numerical Example 2. FIG. 6 shows an aberration in the wide-angle end state, FIG. 7 shows an aberration in the intermediate focal distance state, and FIG. 8 shows an aberration in the telephoto end state.

In FIGS. 6 to 8, a solid line indicates a value on a sagittal image plane and a dashed line indicates a value on a meridional image plane in the field curvature diagram.

From each aberration diagram, in Numerical Example 2, it is apparent that various aberrations are satisfactorily corrected and an excellent imaging performance is realized.

Third Embodiment

Figure 9:
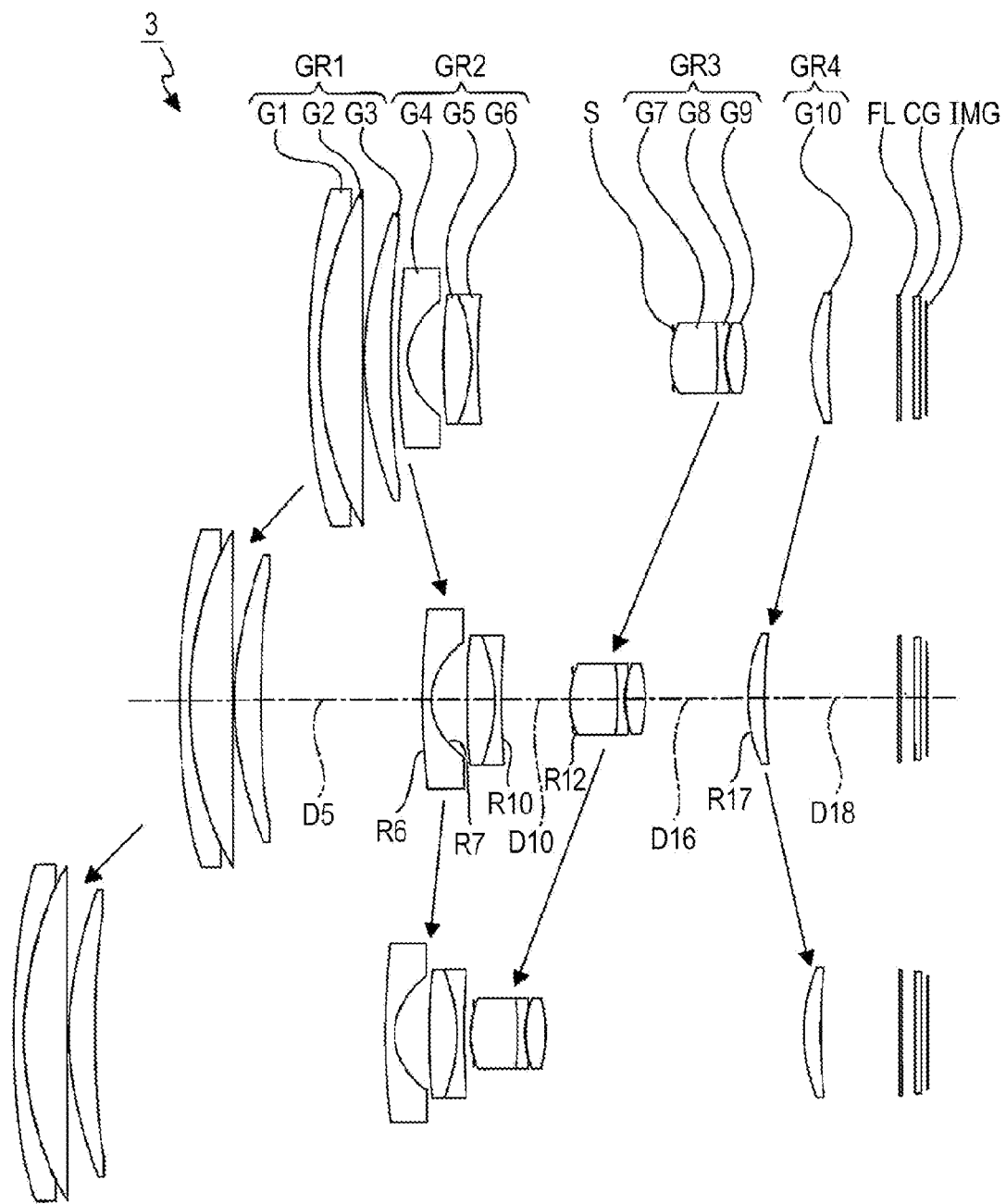
FIG. 9 is a diagram illustrating the configuration of a zoom lens according to a third embodiment.

FIG. 9 is a diagram illustrating the configuration of the zoom lens 3 according to a third embodiment of the present technology.

In the zoom lens 3, a first lens group GR1 having a positive refracting power, a second lens group GR2 having a negative refracting power, a third lens group GR3 having a positive refracting power, and a fourth lens group GR4 having a positive refracting power are arranged in order from the object side to the image side.

The variable magnifying ratio of the zoom lens 3 is set to 14.1-fold.

In the first lens group GR1, a cemented lens, which is formed by joining a meniscus-shaped negative lens G1 with a convex surface facing the object side and a positive lens G2 with a biconvex shape, and a meniscus-shaped positive lens G3 with a convex surface facing the object side are arranged in order from the object side to the image side.

In the second lens group GR2, a meniscus-shaped negative lens G4 with a convex surface facing the object side and a cemented lens, which is formed by joining a positive lens G5 with a biconvex shape and a negative lens G6 with a biconcave shape, are arranged in order from the object side to the image side.

In the third lens group GR3, a cemented lens, which is formed by joining a positive lens G7 with a biconvex shape and a negative lens G8 with a biconcave shape, and a positive lens G9 with a biconvex shape are arranged in order from the objet side to the image side.

The fourth lens group GR4 includes a meniscus-shaped positive lens G10 with a convex surface facing the object side.

Between the fourth lens group GR4 and an image surface IMG, a filter FL and a cover glass CG are arranged in order from the object side to the image side.

An aperture stop S is disposed near the third lens group GR3 on the object side and is moved together with the third lens group GR3.

At the zooming time, the first lens group GR1, the second lens group GR2, the third lens group GR3, and the fourth lens group GR4 are configured as a moving lens group.

Table 9 shows lens data of Numerical Example 3 in which specific numerical values are applied to the zoom lens 3 according to the third embodiment.

TABLE 9

| Si | Ri | Di | Ni | vi |
|---|---|---|---|---|
| 1 | 49.0330 | 0.800 | 1.84670 | 23.78 |
| 2 | 25.0753 | 3.226 | 1.59280 | 68.62 |
| 3 | 1748.3928 | 0.150 | | |

TABLE 9-continued

| Si | Ri | Di | Ni | vi |
|---|---|---|---|---|
| 4 | 27.2501 | 2.031 | 1.80420 | 46.50 |
| 5 | 99.8946 | (D5) | | |
| 6(ASP) | 22.6767 | 0.700 | 1.88200 | 37.23 |
| 7(ASP) | 4.3390 | 2.785 | | |
| 8 | 80.7604 | 2.104 | 1.94590 | 17.98 |
| 9 | −10.8343 | 0.550 | 1.88200 | 37.23 |
| 10(ASP) | 33.9455 | (D10) | | |
| 11 | 0.0000 | −0.150 | (APERTURE STOP) | |
| 12(ASP) | 5.5288 | 3.491 | 1.68890 | 31.16 |
| 13 | −40.8708 | 0.504 | 1.92290 | 20.88 |
| 14 | 5.8688 | 0.260 | | |
| 15 | 10.8116 | 1.304 | 1.65840 | 50.85 |
| 16 | −10.8116 | (D16) | | |
| 17(ASP) | 11.2395 | 1.282 | 1.49710 | 81.56 |
| 18 | 32.7960 | (D18) | | |
| 19 | 0.0000 | 0.100 | 1.51200 | 56.89 |
| 20 | 0.0000 | 1.000 | | |
| 21 | 0.0000 | 0.500 | 1.55670 | 58.56 |
| 22 | 0.0000 | 0.300 | | |

In the zoom lens 3, both surfaces (sixth and seventh surfaces) of a negative lens G4 of the second lens group GR2, the surface (tenth surface) of a negative lens G6 facing the image side, the surface (twelfth surface) of the positive lens G7 of the third lens group GR3 facing the object side, and the surface (seventeenth surface) of the positive lens G10 of the fourth lens group GR4 facing the object side are configured as aspherical surfaces. Table 10 shows the fourth, sixth, eighth, and tenth order aspherical coefficients "A", "B", "C", and "D" of the aspherical surfaces and the cone constant "K" in Numeral Example 3.

TABLE 10

| Si | κ | A | B | C | D |
|---|---|---|---|---|---|
| 6 | −3.24402E+00 | −4.89046E−04 | 2.05055E−06 | 3.99485E−08 | −3.78567E−10 |
| 7 | −8.28192E−01 | 8.16420E−04 | 1.38842E−05 | −2.33889E−07 | −8.11206E−10 |
| 10 | −5.59494E+00 | −5.89412E−04 | 1.87279E−06 | −2.55436E−07 | −1.34405E−09 |
| 12 | −3.24279E−01 | −2.62136E−04 | 3.37140E−06 | 8.13277E−10 | −7.47976E−12 |
| 17 | −3.31592E−01 | −5.89583E−05 | 5.22942E−06 | −1.00493E−07 | −1.36460E−12 |

Table 11 shows the F number Fno and the half field angle ω in the wide-angle end state, the intermediate focal distance state, and the telephoto end state in Numerical Example 3.

TABLE 11

| | WIDE-ANGLE END | INTERMEDIATE FOCAL DISTANCE | TELEPHOTO END |
|---|---|---|---|
| f | 4.41 | 16.14 | 62.27 |
| Fno | 3.46 | 4.74 | 6.09 |
| ω | 41.37 | 13.52 | 3.57 |

In the zoom lens 3, the surface distance D5 between the first lens group GR1 and the second lens group GR2, the surface distance D10 between the second lens group GR2 and the aperture stop S, the surface distance D16 between the third lens group GR3 and the fourth lens group GR4, and the surface distance D18 between the fourth lens group GR4 and the filter FL are changed, when the magnification is changed between the wide-angle end state and the telephoto end state. Table 12 shows variable distances of the respective surface distances in the wide-angle end state, the intermediate focal distance state, and the telephoto end state in Numerical Example 3.

TABLE 12

| | WIDE-ANGLE END | INTERMEDIATE FOCAL DISTANCE | TELEPHOTO END |
|---|---|---|---|
| f | 4.41 | 16.14 | 62.27 |
| D5 | 0.46 | 11.97 | 21.74 |
| D10 | 14.44 | 5.11 | 0.55 |
| D16 | 4.88 | 7.71 | 19.19 |
| D18 | 5.42 | 10.02 | 5.72 |

Figure 10:
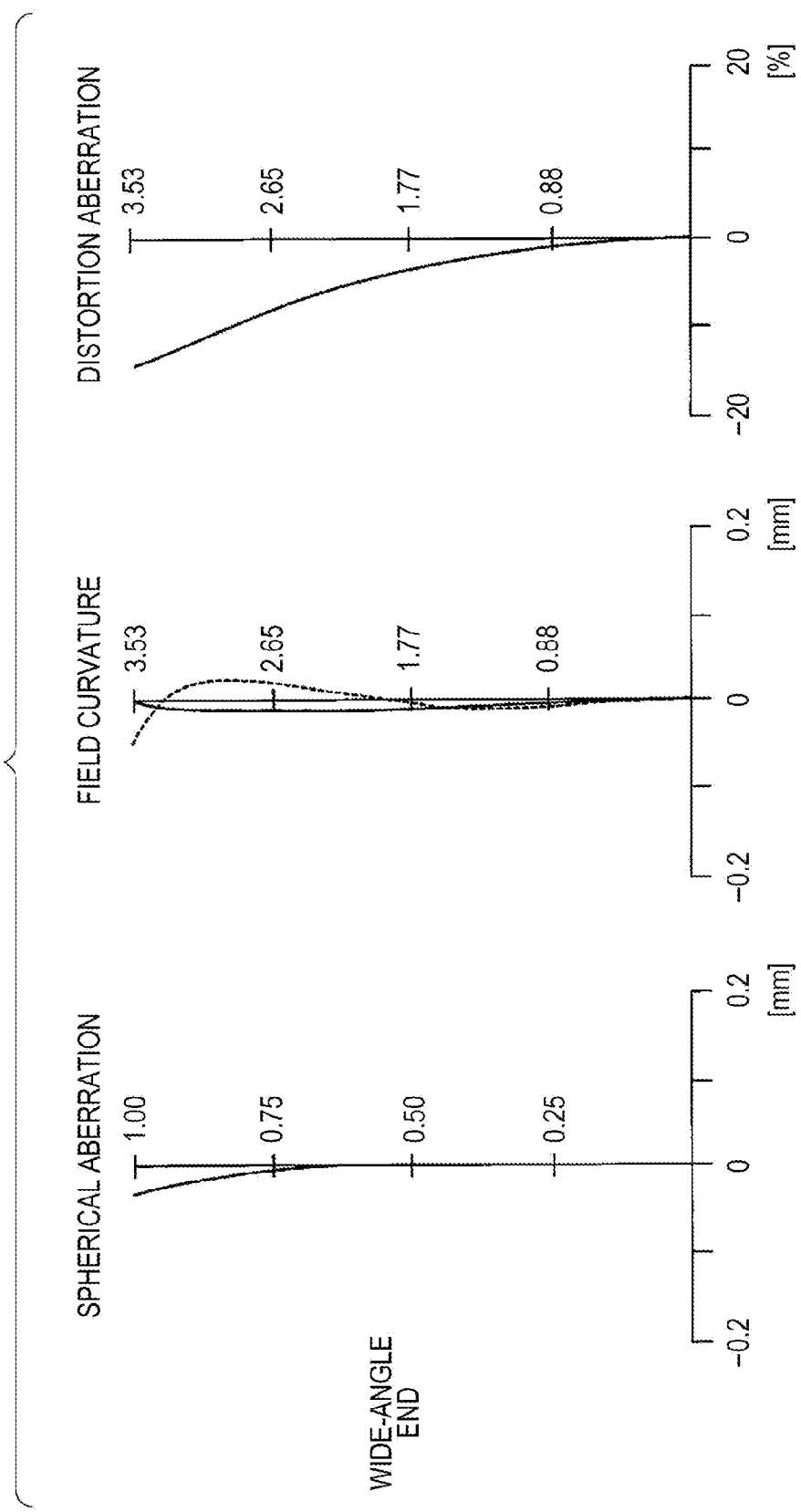
FIG. 10 is a diagram illustrating aberrations together with FIGS. 11 and 12 in an numerical example in which specific numerical values are applied according to the third embodiment and illustrating spherical aberration, field curvature, and distortion aberration in the wide-angle end state.
Figure 11:
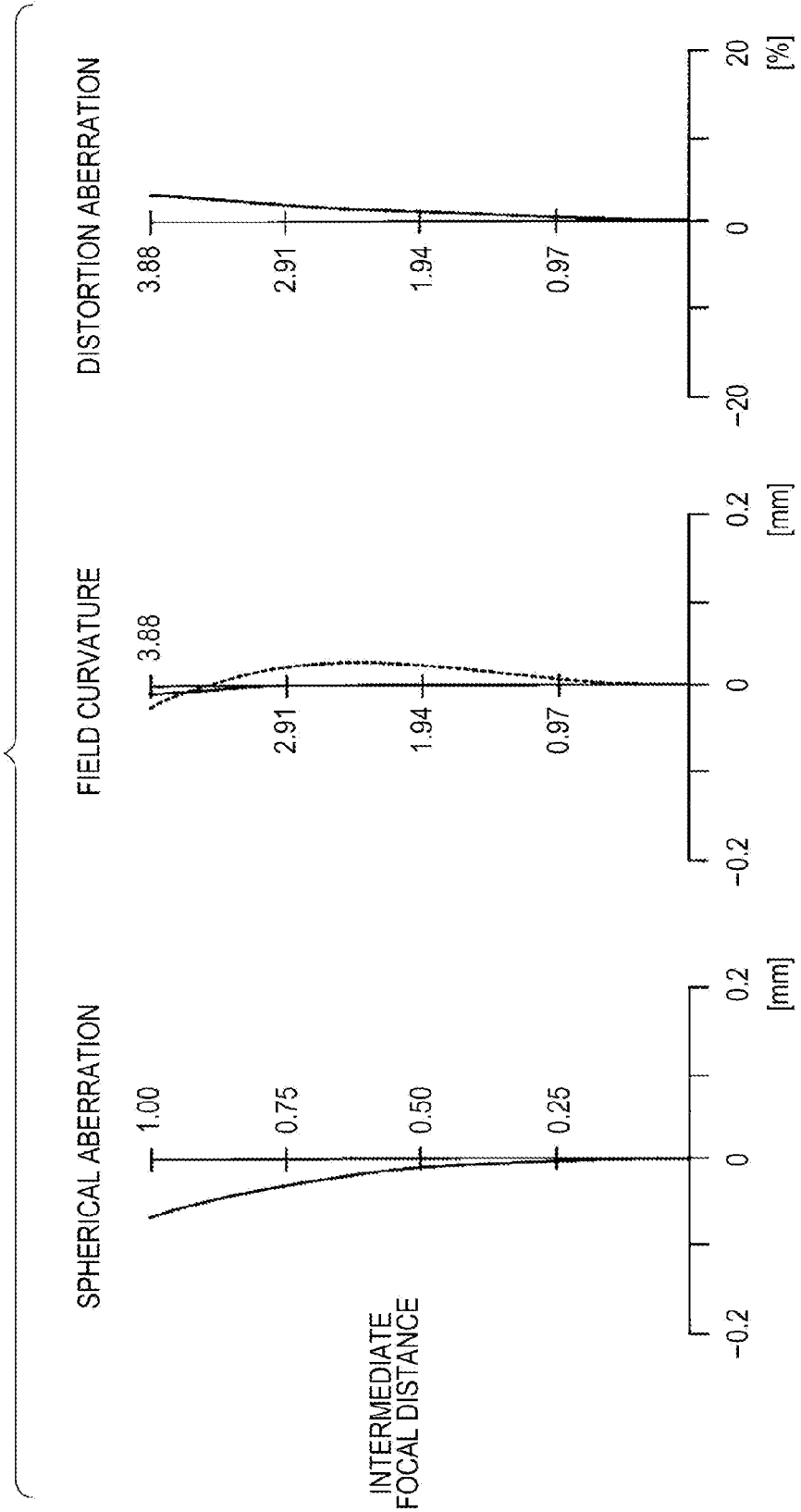
FIG. 11 is a diagram illustrating the spherical aberration, the field curvature, and the distortion aberration in the intermediate focal distance state.
Figure 12:
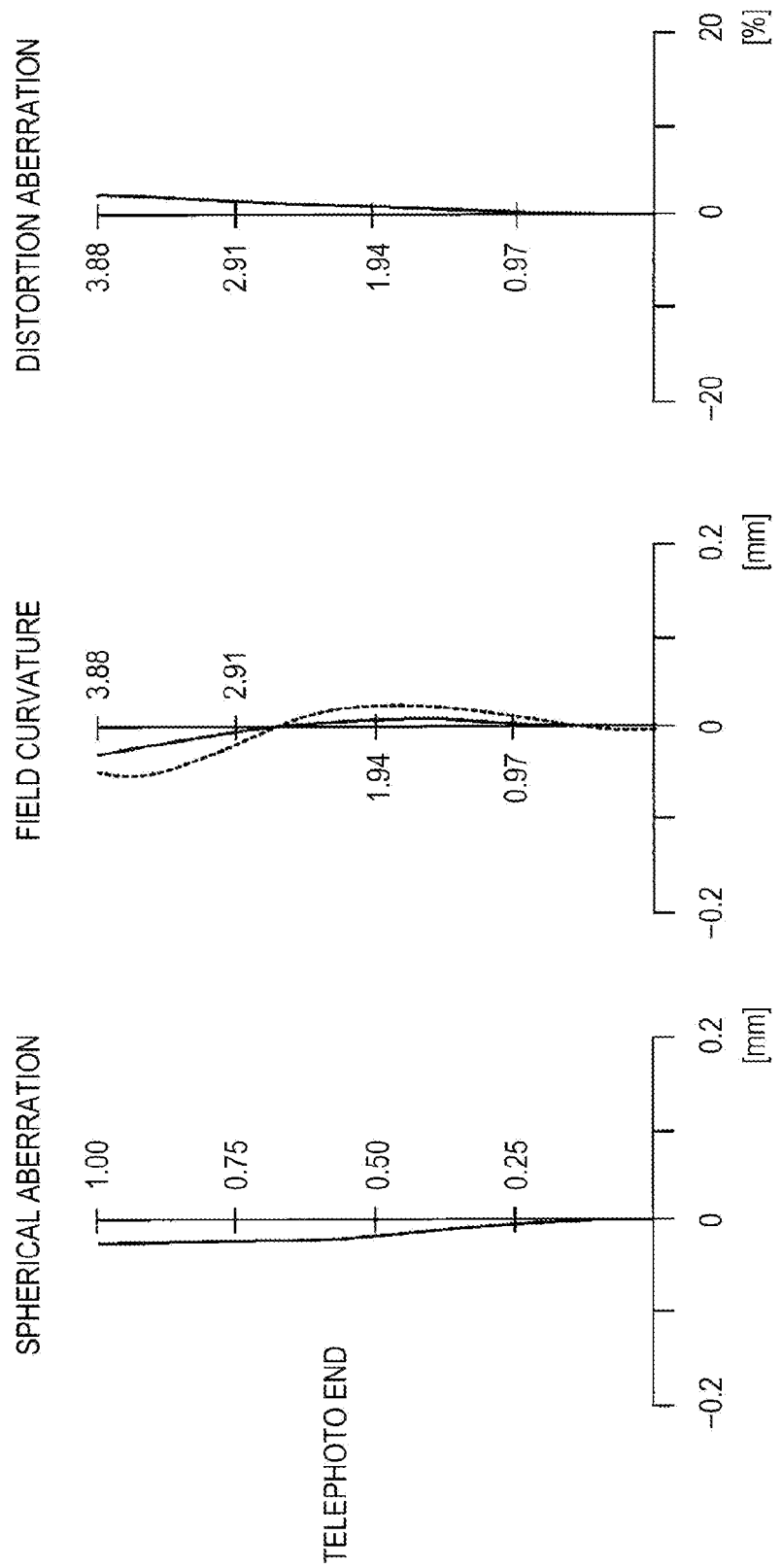
FIG. 12 is a diagram illustrating the spherical aberration, the field curvature, and the distortion aberration in the telephoto end state.

FIGS. 10 to 12 are diagrams illustrating various aberrations in an infinite focusing state of Numerical Example 3. FIG. 10 shows an aberration in the wide-angle end state, FIG. 11 shows an aberration in the intermediate focal distance state, and FIG. 12 shows an aberration in the telephoto end state.

In FIGS. 10 to 12, a solid line indicates a value on a sagittal image plane and a dashed line indicates a value on a meridional image plane in the field curvature diagram.

From each aberration diagram, in Numerical Example 3, it is apparent that various aberrations are satisfactorily corrected and an excellent imaging performance is realized.

Fourth Embodiment

Figure 13:
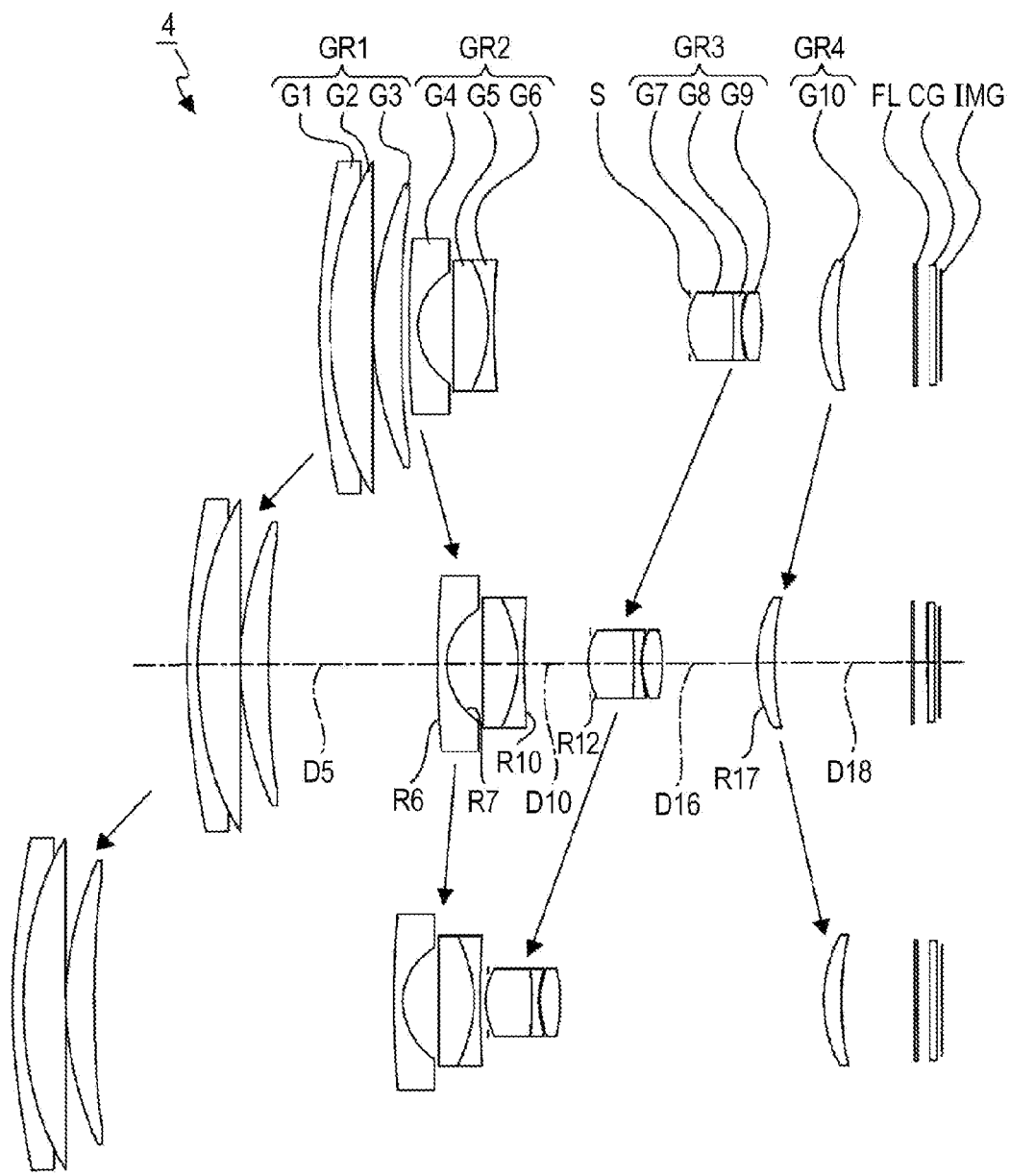
FIG. 13 is a diagram illustrating the configuration of a zoom lens according to a fourth embodiment.

FIG. 13 is a diagram illustrating the configuration of the zoom lens 4 according to a fourth embodiment of the present technology.

In the zoom lens 4, a first lens group GR1 having a positive refracting power, a second lens group GR2 having a negative refracting power, a third lens group GR3 having a positive refracting power, and a fourth lens group GR4 having a positive refracting power are arranged in order from the object side to the image side.

The variable magnifying ratio of the zoom lens 4 is set to 14.1-fold.

In the first lens group GR1, a cemented lens, which is formed by joining a meniscus-shaped negative lens G1 with a convex surface facing the object side and a positive lens G2 with a biconvex shape, and a meniscus-shaped positive lens G3 with a convex surface facing the object side are arranged in order from the object side to the image side.

In the second lens group GR2, a meniscus-shaped negative lens G4 with a convex surface facing the object side and a cemented lens, which is formed by joining a positive lens G5 with a biconvex shape and a negative lens G6 with a biconcave shape, are arranged in order from the object side to the image side.

In the third lens group GR3, a cemented lens, which is formed by joining a positive lens G7 with a biconvex and a negative lens G8 with a biconcave surface, and a positive lens G9 with a biconvex shape are arranged in order from the object side to the image side.

The fourth lens group GR4 includes a meniscus-shaped positive lens G10 with a convex surface facing the object side.

Between the fourth lens group GR4 and an image surface IMG, a filter FL and a cover glass CG are arranged in order from the object side to the image side.

An aperture stop S is disposed near the third lens group GR3 on the object side and is moved together with the third lens group GR3.

At the zooming time, the first lens group GR1, the second lens group GR2, the third lens group GR3, and the fourth lens group GR4 are configured as a moving lens group.

Table 13 shows lens data of Numerical Example 4 in which specific numerical values are applied to the zoom lens 4 according to the fourth embodiment.

TABLE 13

| Si | Ri | Di | Ni | vi |
|---|---|---|---|---|
| 1 | 56.0000 | 0.800 | 1.84670 | 23.78 |
| 2 | 26.7800 | 3.110 | 1.59280 | 68.62 |
| 3 | −3000.0000 | 0.150 | | |
| 4 | 26.1000 | 2.100 | 1.80420 | 46.50 |
| 5 | 87.1800 | (D5) | | |
| 6(ASP) | 17.0800 | 0.700 | 1.88200 | 37.23 |
| 7(ASP) | 4.2000 | 2.710 | | |
| 8 | 140.4000 | 2.600 | 1.94590 | 17.98 |
| 9 | −10.5300 | 0.550 | 1.88200 | 37.23 |
| 10(ASP) | 37.4900 | (D10) | | |
| 11 | 0.0000 | −0.150 | (APERTURE STOP) | |
| 12(ASP) | 5.4500 | 3.360 | 1.68890 | 31.16 |
| 13 | −40.5100 | 0.500 | 1.92290 | 20.88 |
| 14 | 5.7960 | 0.260 | | |
| 15 | 10.9200 | 1.330 | 1.65840 | 50.85 |
| 16 | −10.9200 | (D16) | | |
| 17(ASP) | 10.4000 | 1.350 | 1.49710 | 81.56 |
| 18 | 26.0400 | (D18) | | |
| 19 | 0.0000 | 0.100 | 1.51200 | 56.89 |
| 20 | 0.0000 | 1.000 | | |
| 21 | 0.0000 | 0.500 | 1.55670 | 58.56 |
| 22 | 0.0000 | 0.300 | | |

In the zoom lens 4, both surfaces (sixth and seventh surfaces) of a negative lens G4 of the second lens group GR2, the surface (tenth surface) of a negative lens G6 facing the image side, the surface (twelfth surface) of the positive lens G7 of the third lens group GR3 facing the object side, and the surface (seventeenth surface) of the positive lens G10 of the fourth lens group GR4 facing the object side are configured as aspherical surfaces. Table 14 shows the fourth, sixth, eighth, and tenth order aspherical coefficients "A", "B", "C", and "D" of the aspherical surfaces and the cone constant "K" in Numeral Example 4.

TABLE 14

| Si | κ | A | B | C | D |
|---|---|---|---|---|---|
| 6 | −3.74400E+00 | −6.48530E−04 | 6.02780E−06 | −6.83350E−09 | −1.97000E−10 |
| 7 | −8.60240E−01 | 6.67640E−04 | 1.36000E−05 | −2.54760E−07 | −8.42270E−10 |
| 10 | −1.87450E−01 | −5.95500E−04 | 3.58780E−06 | −2.30760E−07 | −1.32410E−09 |
| 12 | −3.21730E−01 | −2.60430E−04 | 4.47710E−06 | −1.32150E−08 | 0.00000E+00 |
| 17 | −3.11200E−01 | −6.16000E−05 | 5.77380E−06 | −1.16970E−07 | 3.64060E−10 |

Table 15 shows the F number Fno and the half field angle ω in the wide-angle end state, the intermediate focal distance state, and the telephoto end state in Numerical Example 4.

TABLE 15

| | WIDE-ANGLE END | INTERMEDIATE FOCAL DISTANCE | TELEPHOTO END |
|---|---|---|---|
| f | 4.41 | 16.53 | 62.28 |
| Fno | 3.38 | 4.66 | 6.03 |
| ω | 41.37 | 13.21 | 3.57 |

In the zoom lens 4, the surface distance D5 between the first lens group GR1 and the second lens group GR2, the surface distance D10 between the second lens group GR2 and the aperture stop S, the surface distance D16 between the third lens group GR3 and the fourth lens group GR4, and the surface distance D18 between the fourth lens group GR4 and the filter FL are changed, when the magnification is changed between the wide-angle end state and the telephoto end state. Table 16 shows variable distances of the respective surface distances in the wide-angle end state, the intermediate focal distance state, and the telephoto end state in Numerical Example 4.

TABLE 16

| | WIDE-ANGLE END | INTERMEDIATE FOCAL DISTANCE | TELEPHOTO END |
|---|---|---|---|
| f | 4.41 | 16.53 | 62.28 |
| D5 | 0.40 | 12.47 | 22.29 |
| D10 | 14.45 | 4.90 | 0.55 |
| D16 | 4.35 | 6.96 | 19.51 |
| D18 | 5.74 | 10.44 | 5.38 |

Figure 14:
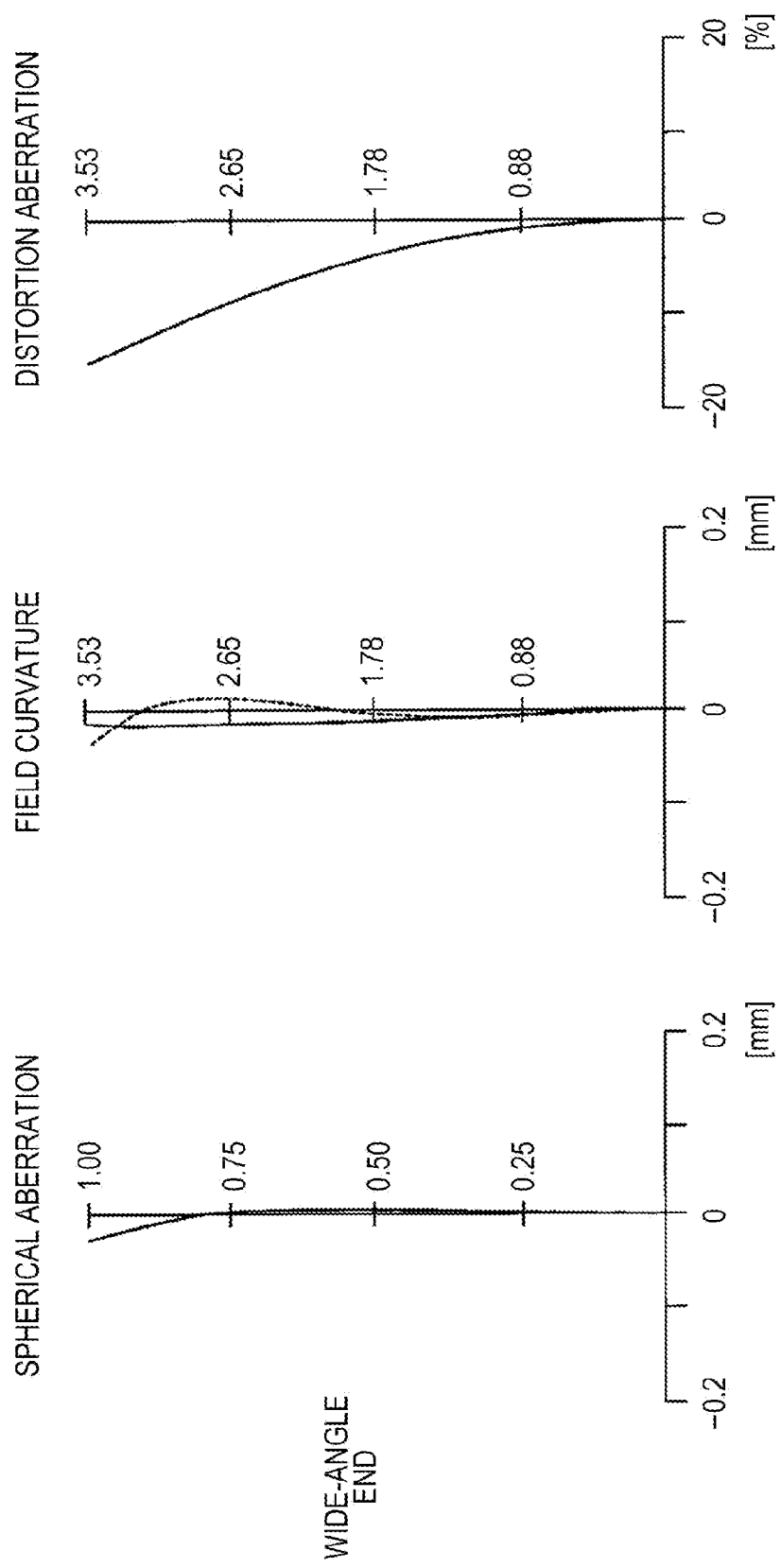
FIG. 14 is a diagram illustrating aberrations together with FIGS. 15 and 16 in an numerical example in which specific numerical values are applied according to the fourth embodiment and illustrating spherical aberration, field curvature, and distortion aberration in the wide-angle end state.
Figure 15:
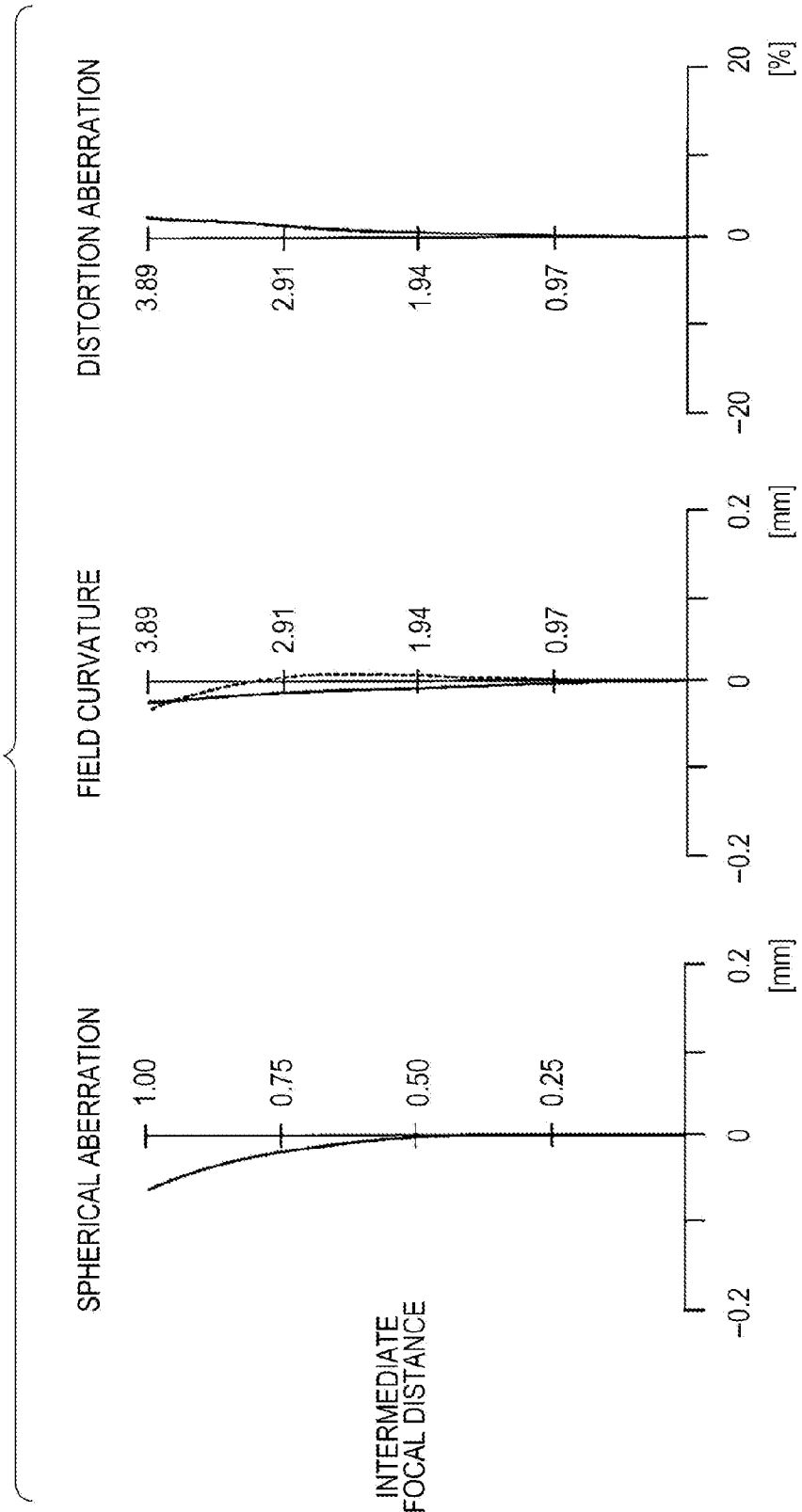
FIG. 15 is a diagram illustrating the spherical aberration, the field curvature, and the distortion aberration in the intermediate focal distance state.
Figure 16:
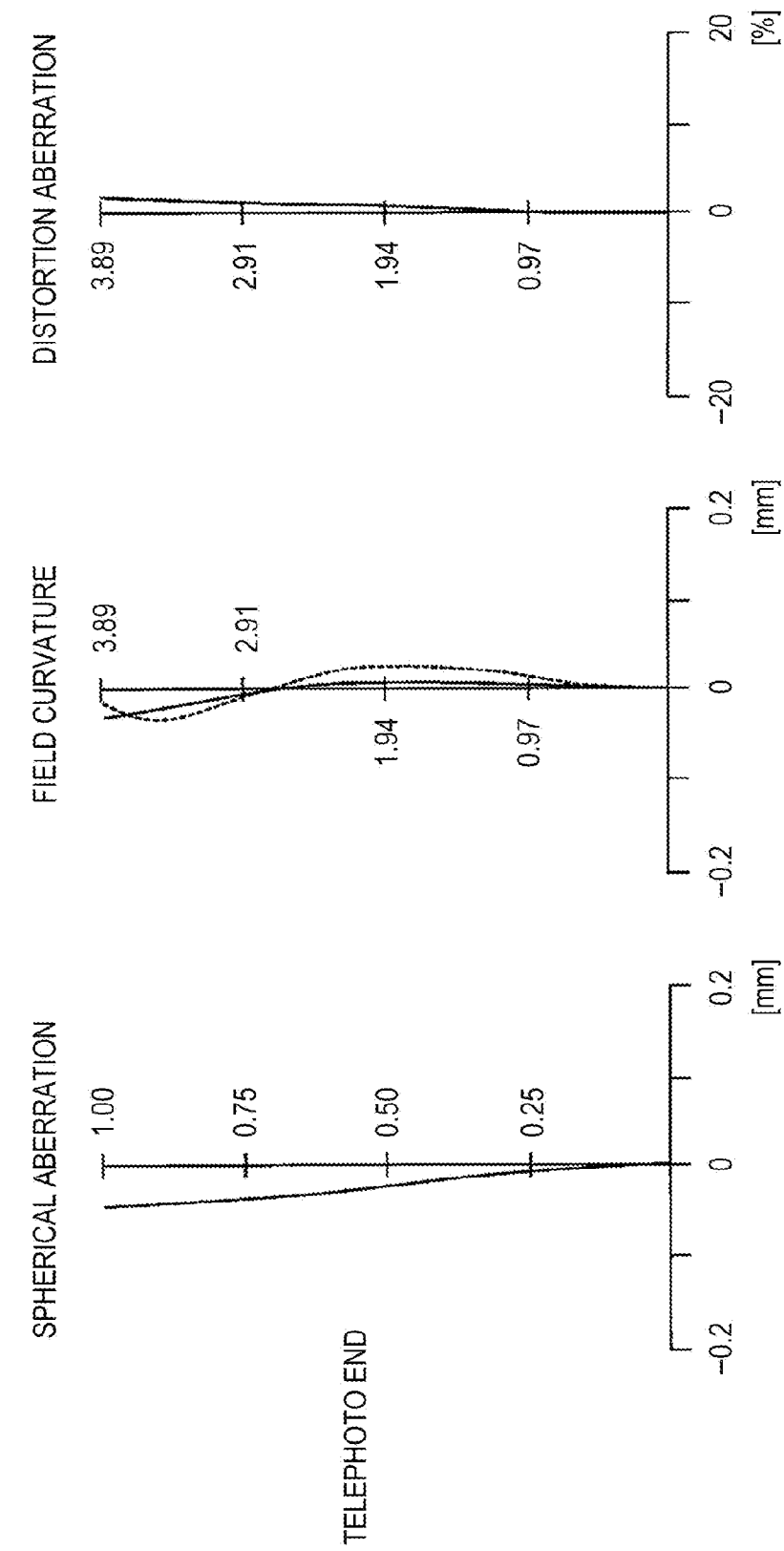
FIG. 16 is a diagram illustrating the spherical aberration, the field curvature, and the distortion aberration in the telephoto end state.

FIGS. 14 to 16 are diagrams illustrating various aberrations in an infinite focusing state of Numerical Example 4. FIG. 14 shows an aberration in the wide-angle end state, FIG. 15 shows an aberration in the intermediate focal distance state, and FIG. 16 shows an aberration in the telephoto end state.

In FIGS. 14 to 16, a solid line indicates a value on a sagittal image plane and a dashed line indicates a value on a meridional image plane in the field curvature diagram.

From each aberration diagram, in Numerical Example 4, it is apparent that various aberrations are satisfactorily corrected and an excellent imaging performance is realized.

Values of Condition Equation of Zoom Lens

Hereinafter, the values of the condition equations of the zoom lens according to the embodiments of the present technology will be described.

Table 17 shows the values Equation (1) to Equation (7) in the zoom lenses 1 to 4.

TABLE 17

|  |  | ZOOM LENS 1 | ZOOM LENS 2 | ZOOM LENS 3 | ZOOM LENS 4 |
|---|---|---|---|---|---|
|  | f2 | −5.934 | −5.829 | −5.627 | −5.756 |
|  | ft | 61.840 | 62.296 | 62.274 | 62.280 |
| CONDITION EQUATION (1) | 0.06 < |f2/ft| < 0.12 | 0.096 | 0.094 | 0.090 | 0.092 |
|  | f3 | 11.634 | 11.220 | 10.815 | 10.903 |
| CONDITION EQUATION (2) | 0.10 < f3/ft < 0.25 | 0.188 | 0.180 | 0.174 | 0.175 |
|  | f21 | −5.998 | −6.245 | −6.155 | −6.439 |
| CONDITION EQUATION (3) | 0.9 < f21/f2 < 1.4 | 1.011 | 1.071 | 1.094 | 1.119 |
|  | f1 | 36.476 | 35.522 | 35.450 | 36.363 |
| CONDITION EQUATION (4) | 0.50 < f1/ft < 0.65 | 0.590 | 0.570 | 0.569 | 0.584 |
|  | d31 | 4.019 | 3.631 | 3.491 | 3.360 |
|  | D3 | 5.901 | 5.641 | 5.559 | 5.450 |
| CONDITION EQUATION (5) | 0.4 < d31/D3 < 0.8 | 0.681 | 0.644 | 0.628 | 0.617 |
|  | Lt | 67.501 | 68.300 | 68.139 | 69.000 |
| CONDITION EQUATION (6) | 0.9 < Lt/ft < 1.3 | 1.092 | 1.096 | 1.094 | 1.108 |
|  | fw | 4.380 | 4.405 | 4.408 | 4.408 |
| CONDITION EQUATION (7) | 8 < ft/fw < 20 | 14.119 | 14.144 | 14.127 | 14.129 |

As apparent from Table 17, the zoom lenses 1 to 4 satisfy Condition Equation (1) to Condition Equation (7).

Configuration of Imaging Apparatus

An imaging apparatus according to an embodiment of the present technology includes a zoom lens and an imaging element that converts an optical image formed by the zoom lens into an electric signal. In the zoom lens, a first lens group having a positive refracting power, a second lens group having a negative refracting power, a third lens group having a positive refracting power, and a fourth lens group having a positive refracting power are arranged in order from an object side to an image side.

When the zoom lens of the imaging apparatus according to the embodiment of the present technology is zoomed from the wide-angle end state to the telephoto end state, the first lens group is moved toward the object side so that the distance between the first and second lens groups increases and the third lens group is moved toward the object side so that the distance between the second and third lens groups decreases.

When the zoom lens has the above-described configuration, it is possible to improve a variable magnifying power effect by the second and third lens groups and also shorten the entire length of an optical system.

Since a field angle is wide in the wide-angle end state, an off-axis luminous flux passing through the first and second lens groups becomes distant from an optical axis. Therefore, the off-axis luminous flux passing through the first lens group is made not to be too wide by disposing the first and second lens groups closely.

When the position of the zoom lens is changed from the wide-angle end state to the telephoto end state, the field angle is narrowed. Further, when an aperture stop is disposed near the third lens group, that is, between the second and third lens groups, or in the third lens group, the second lens group becomes close to the aperture stop. Therefore, the off-axis luminous flux passing through the first and second lens groups becomes close to the optical axis. By using the change in the height of the off-axis luminous flux passing through the first and second lens groups, it is possible to satisfactorily correct a variation in an off-axis aberration caused by the change in the lens position state.

Accordingly, the miniaturization of the zoom lens is achieved and an excellent optical performance can be ensured in the entire zoom region.

In the zoom lens of the imaging apparatus according to the embodiment of the present technology, the second lens group includes three lenses, that is, a negative lens, a positive lens, and a negative lens arranged in order from the object side to the image side.

By disposing the three lenses in a symmetric shape of the positive, negative, and positive lenses, the negative refracting power can be reinforced while satisfactorily correcting off-axis aberration such as distortion aberration or astigmatism in the entire zoom region. Accordingly, it is possible to simultaneously suppress aberration variation caused due to movement of the second lens group and realize highly variable magnifying power.

In order to realize the highly variable magnifying power of the zoom lens, the negative refracting power of the second lens group has to be reinforced. In the imaging apparatus according to the embodiment of the present technology, accordingly, the second lens group includes a single negative lens as a first sub-group and positive and negative lenses as a second sub-lens group.

Since in the wide-angle end state, the first sub-group is distant from the aperture stop disposed near the third lens group, that is, between the second and third lens groups or in the third lens group, the height of the light beam passing by a change in the field angle is considerably changed. Therefore, the first sub-group has a function of satisfactorily correcting the off-axis aberration such as distortion aberration or astigmatism in the entire zoom region.

Since the second sub-group is disposed near the aperture stop, the second sub-group has a function of mainly correcting spherical aberration. By cancelling various aberrations generated in the negative lens of the first sub-group, it is possible to suppress the aberration generated in the second lens group.

Further, the second sub-group includes a single positive lens and a single negative lens in order to reduce the burden on the aberration correction of the negative lens of the first sub-group. When the second sub-group includes two lenses or one lens, it is possible to control the thickness of the second lens group in an optical axis direction. The movement amount of the second lens group is sufficiently ensured, thereby contributing to the high variable magnifying power.

Further, when the second sub-group is configured by a cemented lens of the positive and negative lenses, it is possible to reduce sensitivity to manufacturing errors and also improve assembling workability.

In the zoom lens of the imaging apparatus according to the embodiment of the present technology, the third lens group includes three lenses, that is, a positive lens, a negative lens, and a positive lens arranged in order from the object side to the image side.

By disposing the three lenses in a symmetric shape of the positive, negative, and positive lenses, the positive refracting power can be reinforced while satisfactorily correcting spherical aberration in the entire zoom region. Accordingly, it is possible to simultaneously suppress aberration variation caused due to movement of the third lens group and realize highly variable magnifying power. By configuring the positive and negative lenses as the cemented lens on the object side, it is possible to reduce the manufacturing error of the positive and negative lenses cancelling the aberration on the object side. Accordingly, the excellent optical performance can easily be ensured.

When the zoom lens of the imaging apparatus according to the embodiment of the present technology has the above-described configuration, the zoom lens has the excellent optical performance in the entire zoom region. Accordingly, the zoom lens can realize the field angle of 80 degrees and the variable magnifying power of 15-fold in the wide-angle end state, thereby realizing miniaturization, highly variable magnifying power, and high performance.

Embodiment of Imaging Apparatus

FIG. 17 is a block diagram illustrating a digital still camera as the imaging apparatus according to an embodiment of the present technology.

An imaging apparatus (digital still camera) 100 includes a camera block 10 that is in charge of an imaging function, a camera signal processing unit 20 that perform signal processing such as analog-to-digital conversion on a captured image signal, and an image processing unit 30 that records and reproduces the image signal. The imaging apparatus 100 further includes an LCD (Liquid Crystal Display) 40 that displays a captured image or the like, a R/W (Reader/Writer) 50 that writes and reads the image signal to and from a memory card 1000, a CPU (Central Processing Unit) 60 that controls the entire imaging apparatus, an input unit 70 that includes various switches used for a user to perform necessary operations, and a lens driving control unit 80 that controls the driving of lenses disposed in the camera block 10.

The camera block 10 includes an optical system including a zoom lens 11 (the zoom lenses 1, 2, 3, and 4 according to the embodiments of the present technology) and an imaging element 12 such as a CCD (Charge Coupled Device) or a CMOS (Complementary Metal-Oxide Semiconductor).

The camera signal processing unit 20 performs various kinds of signal processing such as conversion of a signal output from the imaging element 12 to a digital signal, noise removal, image quality correction, and conversion of a signal to a luminance color difference signal.

The image processing unit 30 performs compression coding or decompression decoding on an image signal based on a predetermined image data format or a process of converting data specification such as resolution.

The LCD 40 has a function of displaying the state of a user operation on the input unit 70 or various kinds of data such as a captured image.

The R/W 50 writes the image data coded by the image processing unit 30 in the memory card 1000 and reads the image data recorded in the memory card 1000.

The CPU 60 functions as a control processing unit that controls each circuit block of the imaging apparatus 100 and controls each circuit block based on an instruction input signal or the like from the input unit 70.

For example, the input unit 70 includes a shutter release button used to perform a shutter operation or a selection switch used to select an operation mode and outputs an instruction input signal in response to a user operation to the CPU 60.

The lens driving control unit 80 controls a motor (not shown) or the like that drives each lens of the zoom lens 11 based on a control signal from the CPU 60.

The memory card 1000 is a semiconductor memory that is detachably mounted on a slot connected to, for example, the R/W 50.

Hereinafter, an operation of the imaging apparatus 100 will be described.

In an imaging standby state, an image signal captured by the camera block 10 is output to the LCD 40 via the camera signal processing unit 20 and is displayed as a camera-through image under the control of the CPU 60. When the input unit 70 inputs an instruction input signal used to perform zooming, the CPU 60 outputs a control signal to the lens driving control unit 80 and a predetermined lens of the zoom lens 11 is moved under the control of the lens driving control unit 80.

When a shutter (not shown) of the camera block 10 operates based on the instruction input signal from the input unit 70, the captured image signal is output from the camera signal processing unit 20 to the image processing unit 30 and is subjected to a compression coding process to be converted to digital data with a predetermined data format. The converted data is output to the R/W 50 and is written in the memory card 1000.

Focusing is performed such that the lens driving control unit 80 moves a predetermined lens of the zoom lens 11 based on a control signal from the CPU 60, for example when a user half presses down the shutter release button of the input unit 70 or fully presses down the shutter release button to perform recording (imaging).

When the image data recorded in the memory card 1000 is reproduced, the R/W 50 reads predetermined image data is read from the memory card 1000 in response to an operation on the input unit 70, the image processing unit 30 performs a decompression decoding process on the image data. Then, the processed image data is output to the LCD 40 and a reproduced image is displayed.

In the embodiment, the example has hitherto been described in which the imaging apparatus is applied to the digital still camera. However, the imaging apparatus is not limited to the digital still camera, but may be widely applied to a digital video camera, a portable telephone embedded with a camera, a camera unit of a digital input/output apparatus, such as a PDA (Personal Digital Assistant) embedded with a camera.

Present Technology

The present technology may be embodied as follows.

<1> A zoom lens includes a first lens group having a positive refracting power, a second lens group having a negative refracting power, a third lens group having a positive refracting power, and a fourth lens group having a positive refracting power arranged in order from an object side to an image side. When the zoom lens is zoomed from a wide-angle end state to a telephoto end state, the first lens group is moved toward the object side so that a distance between the first and second lens groups increases and the third lens group is moved toward the object side so that a distance between the second and third lens groups decreases. The second lens group includes three lenses, that is, a negative lens, a positive lens, and a negative lens in order from the object side to the image side. The third lens group includes three lenses, that is, a positive lens, a negative lens, and a positive lens in order from the object side to the image side.

<2> In the zoom lens according to <1>, Condition Equation (1) below is satisfied:

$$0.06<|f2/ft|<0.12, \quad (1)$$

where f2 is a focal distance of the second lens group and ft is a focal distance of the entire lens system at the telephoto end.

<3> In the zoom lens according to <1> or <2>, Condition Equation (2) below is satisfied:

$$0.10<f3/ft<0.25, \quad (2)$$

where f3 is a focal distance of the third lens group and ft is a focal distance of the entire lens system at the telephoto end.

<4> In the zoom lens according to any one of <1> to <3>, Condition Equation (3) below is satisfied:

$$0.9<f21/f2<1.4, \quad (3)$$

where f21 is a focal distance of a negative lens disposed closest to the object side in the second lens group and f2 is a focal distance of the second lens group.

<5> In the zoom lens according to any one of <1> to <4>, Condition Equation (4) below is satisfied:

$$0.50<f1/ft<0.65, \quad (4)$$

where f1 is a focal distance of the first lens group and ft is a focal distance of the entire lens system at the telephoto end.

<6> In the zoom lens according to any one of <1> to <5>, Condition Equation (5) below is satisfied:

$$0.4<d31/D3<0.8, \quad (5)$$

where d31 is a thickness of the positive lens disposed closest to the object side in the third lens group and D3 is a thickness of the entire third lens group along an optical axis.

<7> In the zoom lens according to any one of <1> to <6>, Condition Equation (6) below is satisfied:

$$0.9<Lt/ft<1.3, \quad (6)$$

where Lt is an entire length of the lens system in a telephoto end and ft is a focal distance of the entire lens system at the telephoto end.

<8> In the zoom lens according to any one of <1> to <7>, the first lens group includes three lenses, that is, a negative lens, a positive lens, and a positive lens arranged in order from the object side to the image side.

<9> In the zoom lens according to any one of <1> to <8>, Condition Equation (7) below is satisfied:

$$8<ft/fw<20, \quad (7)$$

where ft is a focal distance of the entire lens system at a telephoto end and fw is a focal distance of the entire lens system at a wide-angle end.

The present technology contains subject matter related to that disclosed in Japanese Priority Patent Application JP 2011-029882 filed in the Japan Patent Office on Feb. 15, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
a first lens group having a positive refracting power, a second lens group having a negative refracting power, a third lens group having a positive refracting power, and a fourth lens group having a positive refracting power arranged in order from an object side to an image side along an optical axis, wherein the second lens group includes three lenses, that is, a negative lens, a positive lens, and a negative lens in order from the object side to the image side, wherein the third lens group includes three lenses, that is, a positive lens, a negative lens, and a positive lens in order from the object side to the image side and wherein the first lens group, the second lens group, the third lens group and the fourth lens group move along the optical axis to and between a wide-angle end state and an intermediate state and to and between the intermediate state and a telephoto end state such that:

in the wide-angle end state, the first lens group is disposed at first lens group position 1A, the second lens group is disposed at a second lens group position 2A, the third lens group is disposed at a third lens group position 3A and the fourth lens group is disposed at a fourth lens group position 4A, in the intermediate state, the first lens group is disposed at a first lens group position 1B which is forwardly of the first lens group position 1A toward the object side, the second lens group is disposed at a second lens group position 2B which is rearwardly of the second lens group position 2A toward the image side, the third lens group is disposed at a third lens group position 3B which is forwardly of the third lens group position 3A toward the object side and the fourth lens group is disposed at a fourth lens group position 4B which is forwardly of the fourth lens group position 4A toward the image side, and in the telephoto end state, the first lens group is disposed at a first lens group position 1C which is forwardly of the first lens group position 1B toward the object side, the second lens group is disposed at a second lens group position 2C which is either the same location of second lens group position 2B or substantially the same location of second lens group position 2B being bias slightly incrementally forward of the second lens group position 2B toward the object side, the third lens group is disposed at a third lens group position 3C which is forwardly of the third lens group position 3B toward the object side and the fourth lens group is disposed at a fourth lens group position 4C which is rearwardly of the fourth lens group position 4B toward the image side.

2. The zoom lens according to claim 1, wherein Condition Equation (1) below is satisfied:

$$0.06<|f2/ft|<0.12, \quad (1)$$

where f2 is a focal distance of the second lens group and ft is a focal distance of the entire lens system at the telephoto end.

3. The zoom lens according to claim 1, wherein Condition Equation (2) below is satisfied:

$$0.10<f3/ft<0.25, \quad (2)$$

where f3 is a focal distance of the third lens group and ft is a focal distance of the entire lens system at the telephoto end.

4. The zoom lens according to claim 1, wherein Condition Equation (3) below is satisfied:

$$0.9<f21/f2<1.4, \quad (3)$$

where f21 is a focal distance of a negative lens disposed closest to the object side in the second lens group and f2 is a focal distance of the second lens group.

5. The zoom lens according to claim 1, wherein Condition Equation (4) below is satisfied:

$$0.50<f1/ft<0.65, \quad (4)$$

where f1 is a focal distance of the first lens group and ft is a focal distance of the entire lens system at the telephoto end.

6. The zoom lens according to claim 1, wherein Condition Equation (6) below is satisfied:

$$0.9 < Lt/ft < 1.3, \quad (6)$$

where Lt is an entire length of the lens system in a telephoto end and ft is a focal distance of the entire lens system at the telephoto end.

7. The zoom lens according to claim 1, wherein the first lens group includes three lenses, that is, a negative lens, a positive lens, and a positive lens arranged in order from the object side to the image side.

8. The zoom lens according to claim 1, wherein Condition Equation (7) below is satisfied:

$$8 < ft/fw < 20, \quad (7)$$

where ft is a focal distance of the entire lens system at a telephoto end and fw is a focal distance of the entire lens system at a wide-angle end.

9. The zoom lens according to claim 1, wherein D5 is an on-axial surface distance between respective outer lens surfaces of facially opposing lenses of the first lens group and the second lens group and wherein D5 in the intermediate state ranges to and between 11.97 and 12.47 and in the telephoto end state ranges to and between 21.74 and 23.143.

10. A zoom lens comprising:
a first lens group having a positive refracting power, a second lens group having a negative refracting power, a third lens group having a positive refracting power, and a fourth lens group having a positive refracting power arranged in order from an object side to an image side,
wherein when the zoom lens is zoomed from a wide-angle end state to a telephoto end state, the first lens group is moved toward the object side so that a distance between the first and second lens groups increases and the third lens group is moved toward the object side so that a distance between the second and third lens groups decreases,
wherein the second lens group includes three lenses, that is, a negative lens, a positive lens, and a negative lens in order from the object side to the image side, and
wherein the third lens group includes three lenses, that is, a positive lens, a negative lens, and a positive lens in order from the object side to the image side, and
wherein Condition Equation (5) below is satisfied:

$$0.4 < d31/D3 < 0.8, \quad (5)$$

where d31 is a thickness of the positive lens disposed closest to the object side in the third lens group and D3 is a thickness of the entire third lens group along an optical axis.

11. An imaging apparatus comprising:
a zoom lens; and
an imaging element that converts an optical image formed by the zoom lens into an electric signal,
wherein the zoom lens includes a first lens group having a positive refracting power, a second lens group having a negative refracting power, a third lens group having a positive refracting power, and a fourth lens group having a positive refracting power arranged in order from an object side to an image side,
wherein the second lens group includes three lenses, that is, a negative lens, a positive lens, and a negative lens in order from the object side to the image side,
wherein the third lens group includes three lenses, that is, a positive lens, a negative lens, and a positive lens in order from the object side to the image side and
wherein the first lens group, the second lens group, the third lens group and the fourth lens group move along the optical axis to and between a wide-angle end state and an intermediate state and to and between the intermediate state and a telephoto end state such that:
in the wide-angle end state, the first lens group is disposed at first lens group position 1A, the second lens group is disposed at a second lens group position 2A, the third lens group is disposed at a third lens group position 3A and the fourth lens group is disposed at a fourth lens group position 4A,
in the intermediate state, the first lens group is disposed at a first lens group position 1B which is forwardly of the first lens group position 1A toward the object side, the second lens group is disposed at a second lens group position 2B which is rearwardly of the second lens group position 2A toward the image side, the third lens group is disposed at a third lens group position 3B which is forwardly of the third lens group position 3A toward the object side and the fourth lens group is disposed at a fourth lens group position 4B which is forwardly of the fourth lens group position 4A toward the image side, and
in the telephoto end state, the first lens group is disposed at a first lens group position 1C which is forwardly of the first lens group position 1B toward the object side, the second lens group is disposed at a second lens group position 2C which is either the same location of second lens group position 2B or substantially the same location of second lens group position 2B being bias slightly incrementally forward of the second lens group position 2B toward the object side, the third lens group is disposed at a third lens group position 3C which is forwardly of the third lens group position 3B toward the object side and the fourth lens group is disposed at a fourth lens group position 4C which is rearwardly of the fourth lens group position 4B toward the image side.

12. The zoom lens according to claim 11, wherein D5 is an on-axial surface distance between respective outer lens surfaces of facially opposing lenses of the first lens group and the second lens group and wherein D5 in the intermediate state ranges to and between 11.97 and 12.47 and in the telephoto end state ranges to and between 21.74 and 23.143.

* * * * *